US012700332B2

(12) United States Patent
Schultz et al.

(10) Patent No.: US 12,700,332 B2
(45) Date of Patent: Aug. 4, 2026

(54) ELECTRONIC SHELF LABEL HOLDER

(71) Applicant: Fasteners for Retail, Inc., Twinsburg, OH (US)

(72) Inventors: David A. Schultz, Walworth, WI (US); Alex Souhala, Rockford, IL (US); Justin Joshua Campbell, Pecatonica, IL (US)

(73) Assignee: Fasteners for Retail, Inc., Twinsburg, OH (US)

( * ) Notice: Subject to any disclaimer, the term of this patent is extended or adjusted under 35 U.S.C. 154(b) by 98 days.

(21) Appl. No.: 18/607,300

(22) Filed: Mar. 15, 2024

(65) Prior Publication Data

US 2025/0095517 A1 Mar. 20, 2025

Related U.S. Application Data

(63) Continuation-in-part of application No. 29/912,312, filed on Sep. 15, 2023, now Pat. No. Des. 1,109,806.

(51) Int. Cl.
*G09F 3/20* (2006.01)

(52) U.S. Cl.
CPC .............. *G09F 3/208* (2013.01); *G09F 3/204* (2013.01)

(58) Field of Classification Search
CPC ................................ G09F 3/204; G09F 3/208
USPC ...................................................... 40/661.03
See application file for complete search history.

(56) References Cited

U.S. PATENT DOCUMENTS 2,566,837 A 9/1951 Huelsmeyer
3,320,690 A 5/1967 Forsburg
4,866,868 A 9/1989 Kass
D347,449 S 5/1994 Garfinkle
5,720,398 A 2/1998 Kump et al.
6,035,569 A 3/2000 Nagel et al.
6,069,596 A 5/2000 Marvin et al.
6,119,990 A 9/2000 Kump et al.
D434,452 S 11/2000 Steiner et al.
6,189,248 B1 2/2001 Nagel et al.
(Continued)

FOREIGN PATENT DOCUMENTS

CA 3144934 A1 7/2023
CA 3079881 C 9/2023
(Continued)

OTHER PUBLICATIONS

DE-202021104616-U1 English Translation (Year: 2021).*
(Continued)

*Primary Examiner* — Kyle R Grabowski

(74) *Attorney, Agent, or Firm* — Honigman LLP; Andrew J. Boes

(57) ABSTRACT

An attachment system includes a rear wall including a front side and a rear side formed on an opposite side from the front side, and a base wall extending from the front side of the rear wall to a front edge and including a top side and a bottom side formed on an opposite side from the top side. The attachment system also includes a lower retaining lip disposed on the base wall and spaced apart from the front side to define a first channel extending along the top side of the base wall, a release tab extending from the base wall, and an upper retaining lip extending from the rear wall and spaced apart from the top side of the base wall to define a second channel extending along the front side of the rear wall.

18 Claims, 18 Drawing Sheets

(56) References Cited

U.S. PATENT DOCUMENTS

| | | | |
|---|---|---|---|
| 6,409,132 | B2 | 6/2002 | Heisler et al. |
| 6,553,702 | B1 | 4/2003 | Bacnik |
| D480,949 | S | 10/2003 | Kosir |
| 6,712,324 | B2 | 3/2004 | Catteau et al. |
| 6,793,185 | B2 | 9/2004 | Joliey |
| 6,898,885 | B1 | 5/2005 | Nagel |
| 6,935,062 | B2 | 8/2005 | Lowry et al. |
| D516,633 | S | 3/2006 | Kosir |
| 7,299,579 | B2 | 11/2007 | Lowry |
| 7,316,089 | B2 | 1/2008 | Brinkman |
| 7,455,081 | B2 | 11/2008 | Bacnik |
| D607,061 | S | 12/2009 | Kosir |
| D690,367 | S | 9/2013 | Bruegmann |
| 8,627,588 | B2 | 1/2014 | Rosander et al. |
| 8,683,723 | B2 | 4/2014 | Sjodin et al. |
| 9,224,313 | B2 | 12/2015 | Reibke et al. |
| 9,412,286 | B2 | 8/2016 | Sundholm |
| D768,243 | S | 10/2016 | Garfinkle |
| 9,474,177 | B2 | 10/2016 | Suzuki et al. |
| 9,679,503 | B2 | 6/2017 | Weyer |
| 9,697,753 | B2 | 7/2017 | Johnson et al. |
| 10,706,749 | B1 | 7/2020 | White et al. |
| D906,426 | S | 12/2020 | Wang |
| D922,490 | S | 6/2021 | White et al. |
| D926,886 | S | 8/2021 | White et al. |
| D942,047 | S | 1/2022 | Schulten et al. |
| D942,048 | S | 1/2022 | Schulten et al. |
| 11,430,349 | B2 | 8/2022 | Mazzone |
| 11,450,241 | B2 | 9/2022 | Kim et al. |
| 11,657,735 | B2 | 5/2023 | Sabbagh |
| D989,870 | S | 6/2023 | Walker |
| D1,016,168 | S | 2/2024 | White et al. |
| 2004/0262470 | A1 | 12/2004 | Lowry et al. |
| 2005/0133676 | A1 | 6/2005 | Brinkman et al. |
| 2005/0193612 | A1 | 9/2005 | Lowry |
| 2013/0008065 | A1 | 1/2013 | Danielson |
| 2014/0158846 | A1 | 6/2014 | Nicolis |
| 2016/0027348 | A1 | 1/2016 | Joliey |
| 2017/0103685 | A1 | 4/2017 | Johnson et al. |
| 2017/0116892 | A1 | 4/2017 | Garfinkle |
| 2020/0320904 | A1 | 10/2020 | Phy et al. |
| 2021/0090471 | A1 | 3/2021 | Kim et al. |
| 2023/0276956 | A1 | 9/2023 | Akaba et al. |
| 2023/0394995 | A1 | 12/2023 | Pomerantz |
| 2024/0013683 | A1 | 1/2024 | Akaba et al. |
| 2024/0355235 | A1 | 10/2024 | Zheng |
| 2024/0363033 | A1 | 10/2024 | Rössl |
| 2024/0395174 | A1 | 11/2024 | Herrnegger |
| 2025/0001466 | A1 | 1/2025 | Ansary et al. |
| 2025/0037615 | A1 | 1/2025 | Wang |

FOREIGN PATENT DOCUMENTS

| | | | | | |
|---|---|---|---|---|---|
| CN | 107403586 | A | | 11/2017 | |
| CN | 107533816 | B | | 1/2020 | |
| CN | 217181552 | U | | 8/2022 | |
| CN | 110425449 | B | | 7/2024 | |
| DE | 202012010518 | U1 | * | 11/2012 | ............ G09F 3/204 |
| DE | 202021104616 | U1 | * | 9/2021 | ........... A47F 5/0068 |
| DE | 202022101273 | U1 | * | 4/2022 | ............ G09F 3/208 |
| EP | 1764763 | B1 | | 7/2008 | |
| EP | 2296133 | B1 | | 6/2011 | |
| EP | 2667372 | A1 | | 11/2013 | |
| EP | 2774136 | B1 | | 4/2016 | |
| EP | 3035318 | A1 | | 6/2016 | |
| EP | 2766893 | B1 | | 9/2016 | |
| EP | 2916068 | B1 | | 1/2017 | |
| EP | 2770492 | B1 | | 8/2017 | |
| EP | 3035319 | B1 | | 11/2017 | |
| EP | 3573042 | A1 | | 11/2019 | |
| EP | 3580741 | A1 | | 12/2019 | |
| EP | 2919623 | B1 | | 10/2020 | |
| EP | 3428904 | B1 | | 10/2020 | |
| EP | 3741265 | A1 | | 11/2020 | |
| EP | 2742502 | B1 | | 12/2020 | |
| EP | 4140366 | A1 | | 3/2023 | |
| EP | 4383236 | A3 | | 7/2024 | |
| EP | 3884482 | B1 | | 12/2024 | |
| EP | 4018355 | B1 | | 12/2024 | |
| WO | 2008077971 | A1 | | 7/2008 | |
| WO | 2008098337 | A1 | | 8/2008 | |
| WO | 2009019394 | A1 | | 2/2009 | |
| WO | 2011010003 | A1 | | 1/2011 | |
| WO | 2015110176 | A1 | | 7/2015 | |
| WO | 2022120549 | A1 | | 6/2022 | |

OTHER PUBLICATIONS

DE-202022101273-U1 English Translatoin (Year: 2022).*

DE-202012010518-U1 English Translation (Year: 2012).*

Meethope, posted at meethope.com.cn <http://meethope.com.cn>, posted on Jan. 31, 2017, site visited Jun. 6, 2023. online, available from internet: https://www.bing.com/images/search?view=detailV2&ccid=aFuHTN9%2b&id= 88B3CB6A56E63E4807C712BD25CF3FE194AE9557 <https://www.bing.com/images/search?view=detailV2&ccid=aFuHTN9%2b&id=88B3CB6A56E63E4807C712BD25CF3FE194AE9557> (Year : 2017).

Hiplastics, posted at Alibaba.com <http://Alibaba.com>, posted on Jul. 20, 2020, site visited Jun. 6, 2023. online, available from internet: https://www.bing.com/images/search?view=detailV2&ccid=yqyFKEpf&id= 6447CA913E2423E177987778283123983E518AC6 <http://www.bing.com/images/search?view=detailV2&ccid=yqyFKEpf&id=6447CA913E2423E177987778283123983E518AC6> (Year: 2020 ).

Pvc plastic extruded, posted at Alibaba.com <http://Alibaba.com>, posted on Aug. 15, 2018, site visited Sep. 8, 2022. online, available from internet: https://tineye.com/search/c4cd9946960a9e281a0eea68fc899732272ab07b?sort=score&order=desc&page=1 <https://tineye.com/search/c4cd9946960a9e281a0eea68fc899732272ab07b?sort=score&order=desc&page=1> (Year: 2018).

Electronic shelf label, posted at extru.form.de <http://extru.form.de>, posted on Sep. 5, 2019, site visited Sep. 8, 2022. online, available from internet: https:// tineye.com/search/c139d772b18237f0759a10b07flbae5c28a60d00?sort=score&order=desc&page=1 <https://tineye.com/search/c139d772b18237f0759a10b07flbae5c28a60d00?sort=score&order=desc&page=1> (Year: 2019).

William H. Walker Design U.S. Appl. No. 29/782,260, dated May 5, 2021.

Schultz et al. Design U.S. Appl. No. 29/919,719, dated Dec. 6, 2023.

* cited by examiner

10

ELECTRONIC SHELF LABEL HOLDER

CROSS REFERENCE TO RELATED APPLICATIONS

This application is a continuation-in-part of, and claims priority under 35 U.S.C. § 120 from, U.S. patent application Ser. No. 29/912,312, filed on Sep. 15, 2023. The disclosures of this prior application is considered part of the disclosure of this application and is hereby incorporated by reference in its entirety.

FIELD

The present disclosure relates generally to an electronic shelf label holder for merchandise display systems.

BACKGROUND

This section provides background information related to the present disclosure and is not necessarily prior art.

In self-service retail establishments, such as drug stores, grocery stores and the like, articles are usually displayed for sale on racks consisting of vertically spaced shelves on which the articles are arranged in rows. Due to frequent stock changes, systems to easily add or remove labels to an existing product rail would greatly improve the ease of use.

SUMMARY

One aspect of the disclosure provides an electronic shelf label holder system for securing a display device to a retail shelf. The system includes a rear wall including a front side and a rear side formed on an opposite side from the front side, and a base wall extending from the front side of the rear wall to a front edge and including a top side and a bottom side formed on an opposite side from the top side. The system also includes a lower retaining lip disposed on the top side of the base wall and spaced apart from the front side to define a first channel extending along the top side of the base wall, a release tab extending from the bottom side of the base wall adjacent to the front edge of the base wall, and an upper retaining lip extending from the front side of the rear wall and spaced apart from the top side of the base wall to define a second channel extending along the front side of the rear wall.

Implementations of the disclosure may include one or more of the following optional features. In some examples, the first channel and the second channel cooperate to define a receptacle configured to receive the display device. In some implementations, the system further includes a mounting member attached to the rear side of the rear wall. In these implementations, the mounting member may be configured to attach the rear wall of the attachment system to the retail shelf at a vertical angle. Alternatively, the mounting member may be configured to attach the rear wall of the attachment system to the retail shelf at an oblique angle.

In some examples, the release tab extends from the bottom side of the base wall at an acute angle relative to the bottom side. In some implementations, the release tab is spaced apart from the front of the base wall. In some examples, the release tab extends from a front portion of the base wall. In some implementations, the base wall is perpendicular to the rear wall.

In some examples, the upper retaining lip extends towards the base wall at an oblique angle from the rear wall. In some implementations, the lower retaining lip includes a front wall extending from the top side of the base wall and a rear flange extending from the front wall towards the rear wall. In these implementations, the rear flange may be spaced apart from the top side of the base wall to define a socket between the lower retaining lip and the base wall.

Another aspect of the disclosure provides an electronic shelf label holder system for securing a display device to a retail shelf. The system includes a rear wall including a front side and a rear side formed on an opposite side from the front side, and a base wall extending from the front side of the rear wall to a front edge and including a top side and a bottom side formed on an opposite side from the top side. The system also includes a lower retaining lip disposed on the top side of the base wall and spaced apart from the front side of the rear wall to define a first channel extending along the top side of the base wall, a release tab extending from the bottom side of the base wall and spaced apart from the front edge of the base wall, and an upper retaining lip extending from the front side of the rear wall.

Implementations of the disclosure may include one or more of the following optional features. In some examples, the upper retaining lip is spaced apart from the top side of the base wall to define a second channel extending along the front side of the rear wall. In these examples, wherein the first channel and the second channel may cooperate to define a receptacle configured to receive the display device. In some implementations, the system further includes a mounting member attached to the rear side of the rear wall. In these implementations, the mounting member may be configured to attach the rear wall of the attachment system to the retail shelf at a vertical angle. Alternatively, the mounting member may be configured to attach the rear wall of the attachment system to the retail shelf at an oblique angle.

In some examples, the release tab extends from the bottom side of the base wall at an acute angle relative to the bottom side. In some implementations, the release tab extends from a front portion of the base wall. In some examples, the base wall is perpendicular to the rear wall.

In some implementations, the upper retaining lip extends towards the base wall at an oblique angle from the rear wall. In some examples, the lower retaining lip includes a front wall extending from the top side of the base wall and a rear flange extending from the front wall towards the rear wall. In these examples, the rear flange may be spaced apart from the top side of the base wall to define a socket between the lower retaining lip and the base wall.

This section provides a general summary of the disclosure, and is not a comprehensive disclosure of its full scope or all of its features.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected configurations and not all possible implementations, and are not intended to limit the scope of the present disclosure.

Corresponding reference numerals indicate corresponding parts throughout the drawings.

DETAILED DESCRIPTION

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

Figure 1:
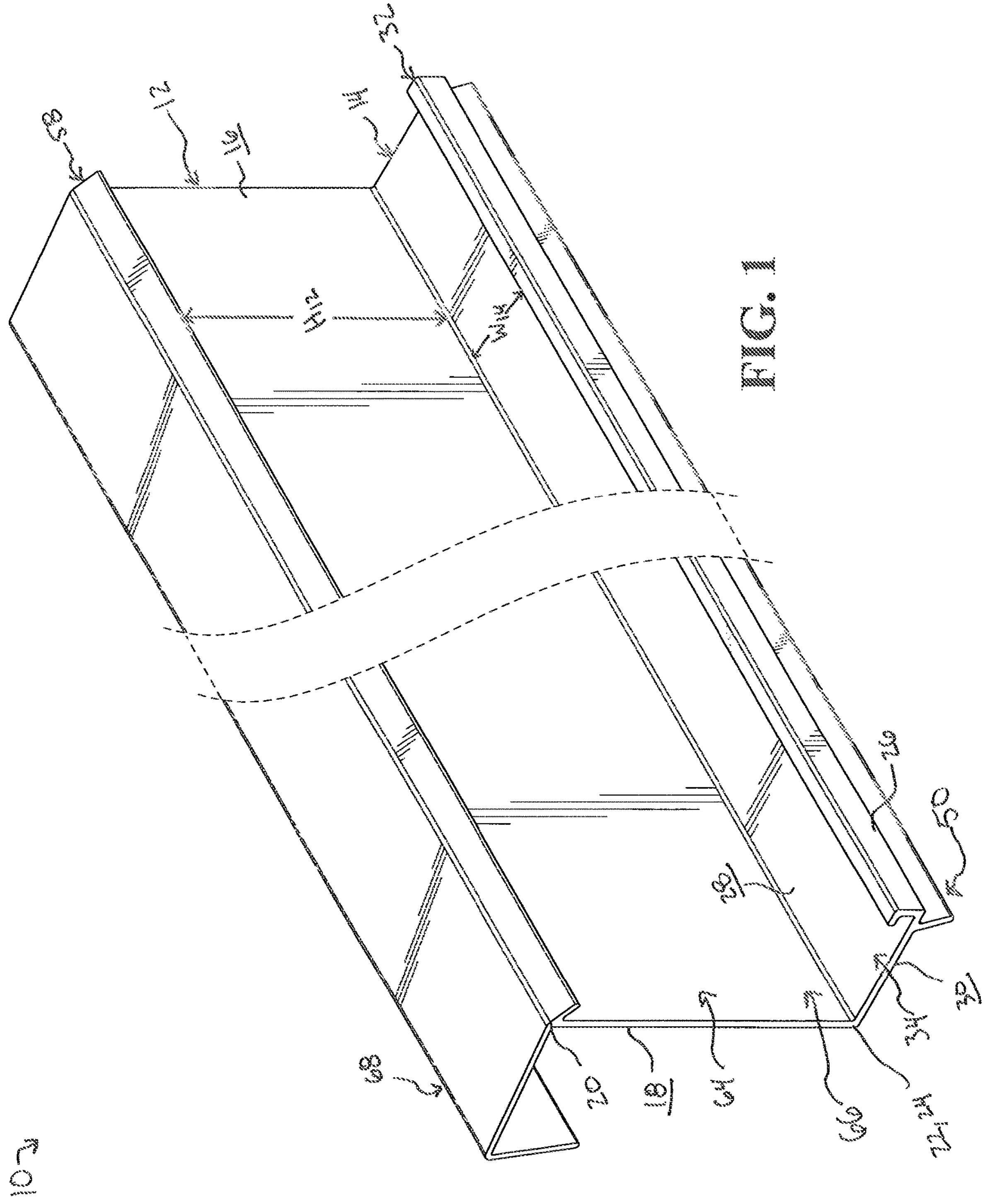
FIG. 1 is a perspective view of an electronic shelf label holder according to an example of the present disclosure.
Figure 2:
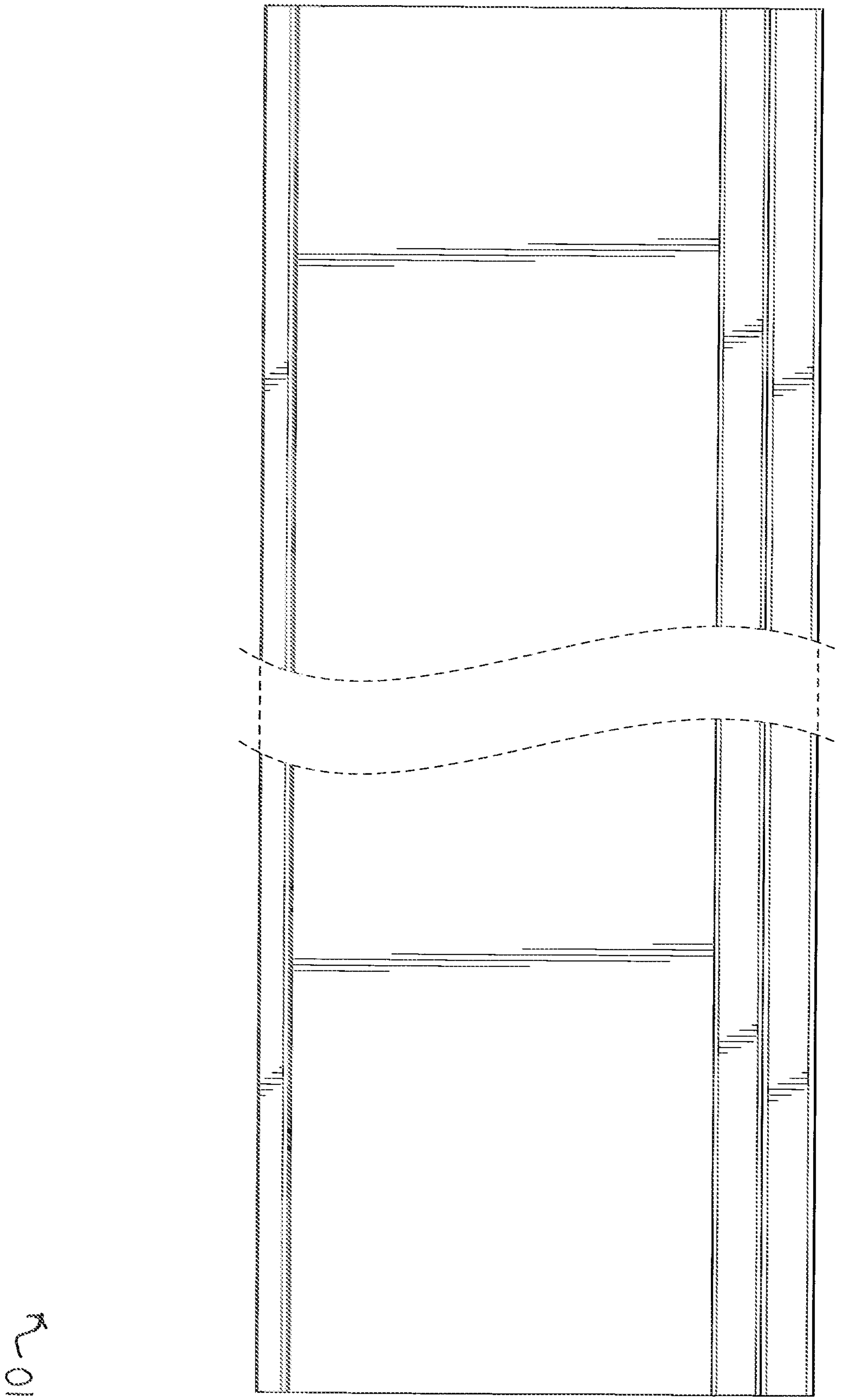
FIG. 2 is a front elevation view of the electronic shelf label holder of FIG. 1.
Figure 3:
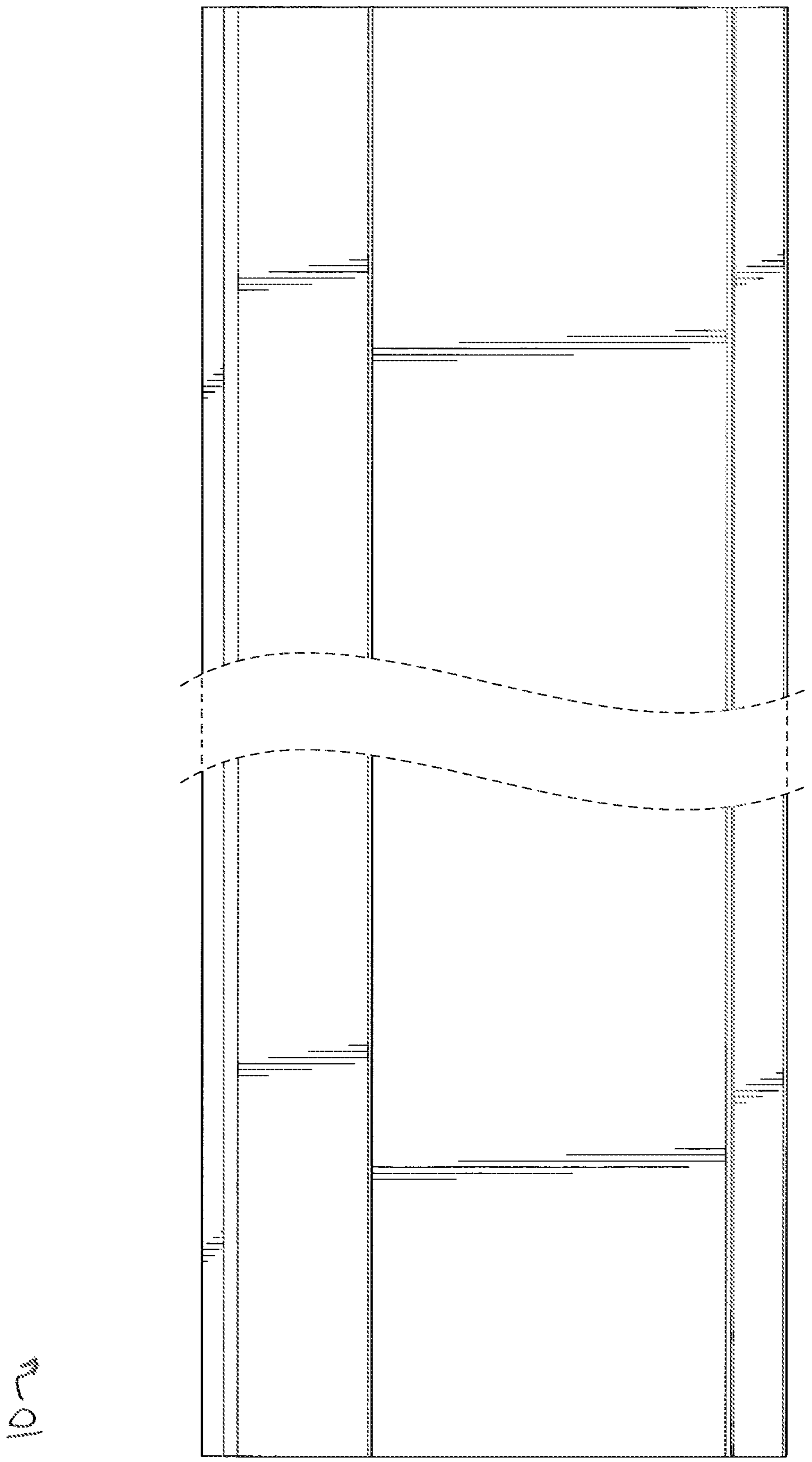
FIG. 3 is a back elevation view of the electronic shelf label holder of FIG. 1.

Referring to FIGS. 1 and 2, an attachment system 10 for securing a display device (not shown) to a retail shelf is generally shown. The attachment system 10 may be formed of a known suitable plastic, such as a thermoplastic extrusion, or metal, such as an aluminum extrusion and may be installed on a front surface (i.e., a front edge) of a shelf, or other suitable base surface for displaying the display device. The shelf may be located in a store or other suitable location where consumers are able to purchase merchandise. The shelf may generally be described as having a shelf body extending from a front edge to an opposite rear edge and along a plane that is generally parallel to a ground surface G, where the front edge and the opposite rear edge each extend perpendicular to the shelf body (i.e., perpendicular to the ground surface G) and between an upper end and a lower end, where the shelf body may generally be disposed between the respective upper end and the lower end of the front edge and the rear edge. As discussed throughout, the direction from the front edge to the rear edge defines a longitudinal direction while the direction parallel to the front edge and the rear edge defines a lateral direction, and the direction from the upper end to the lower end defines a transverse direction. In some implementations, the shelf may include apertures extending through a thickness of the shelf and arranged in series adjacent to each of the front edge and the rear edge of the shelf. Portions of the attachment system 10 may be secured to the shelf via fasteners engaging with the apertures. Additionally or alternatively, the attachment system 10 may be secured to the shelf in any suitable manner, and the attachment system 10 may be selectively detached from the shelf and moved, for example, to another shelf or other surface.

With reference to FIGS. 1-6, the attachment system 10 includes a rear wall 12 and a base wall 14 extending from the rear wall 12. In particular, the rear wall 12 includes a front side 16 and a rear side 18 formed on an opposite side of the rear wall 12 than the front side 16. The rear wall 12 may further be defined as extending from an upper end 20 to a lower end 22 disposed on an opposite end of the rear wall 12 than the upper end 20. As best shown in FIGS. 4A and 4B, the base wall 14 generally extends normal (i.e., perpendicular) to the rear wall 12 and from a first end 24 disposed at the front side 16 of the rear wall 12 to a second, front edge 26. The base wall 14 includes a top side 28 and a bottom side 30 formed on an opposite side of the base wall 14 from the top side 28.

Figure 4B:
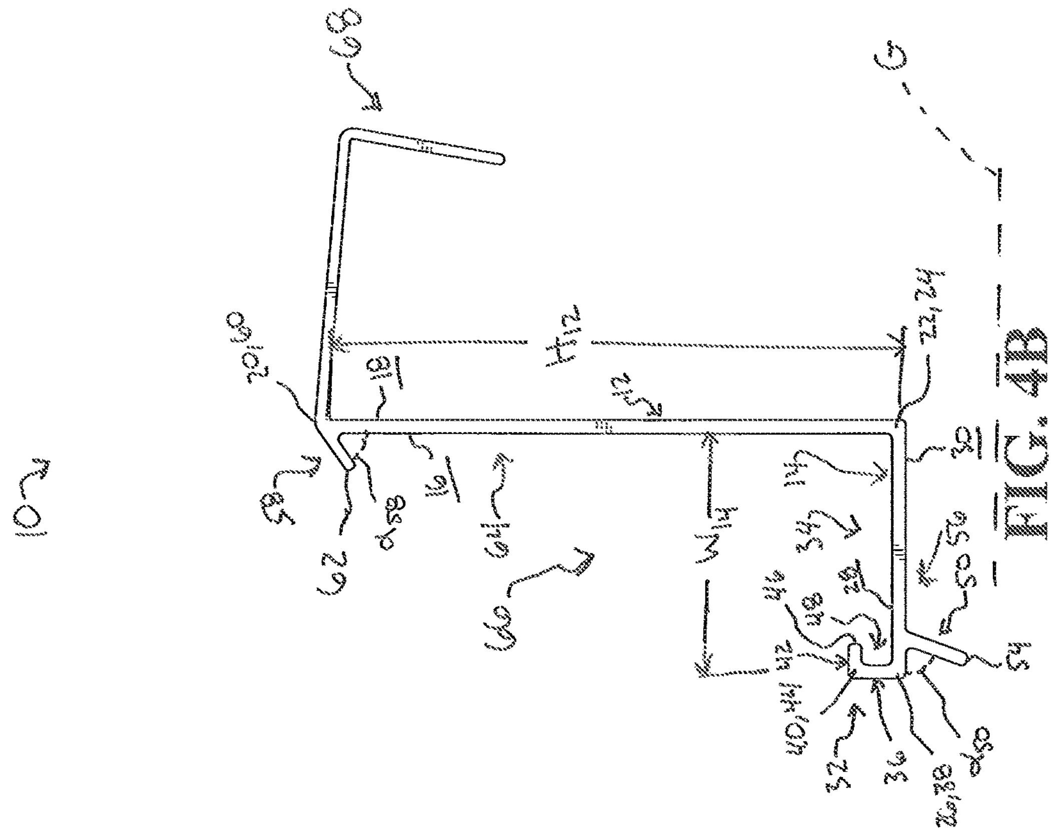
FIG. 4B is a right end elevation view of the electronic shelf label holder of FIG. 1.
Figure 4A:
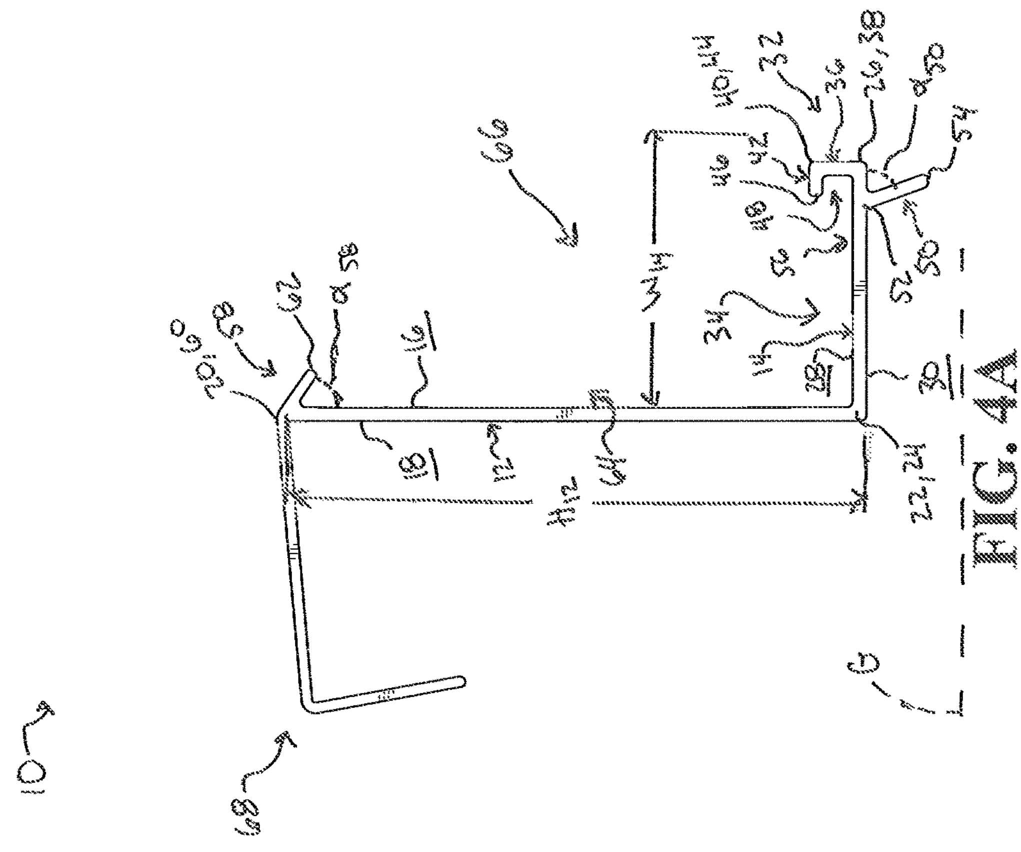
FIG. 4A is a left end elevation view of the electronic shelf label holder of FIG. 1.
Figure 5:
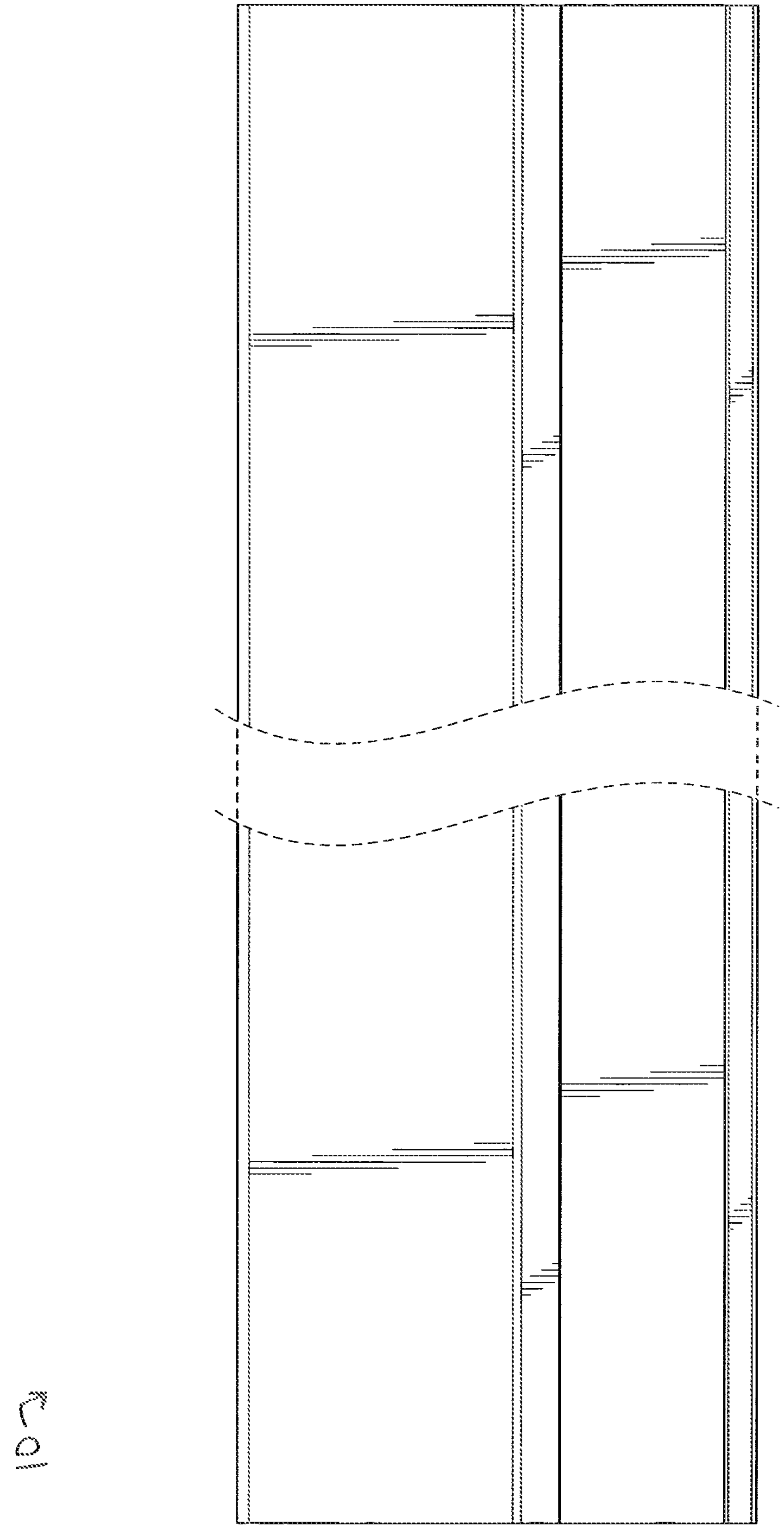
FIG. 5 is a top plan view of the electronic shelf label holder of FIG. 1.
Figure 6:
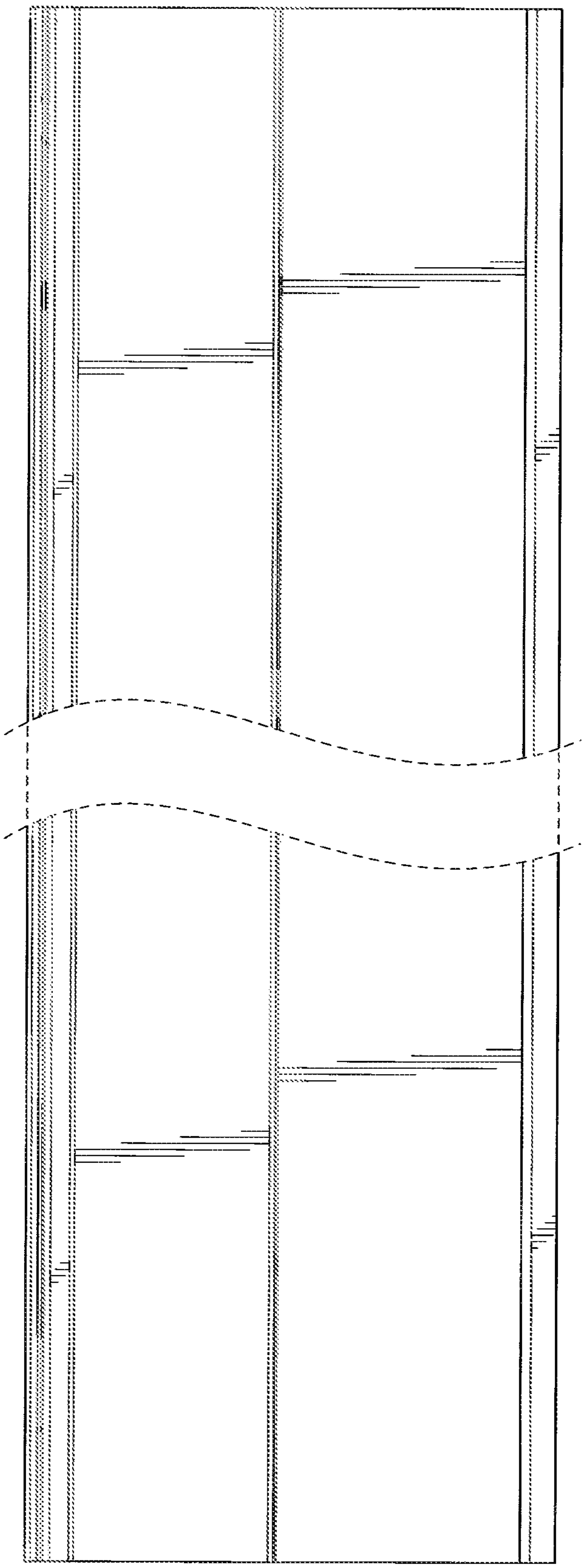
FIG. 6 is a bottom plan view of the electronic shelf label holder of FIG. 1.
Figure 7:
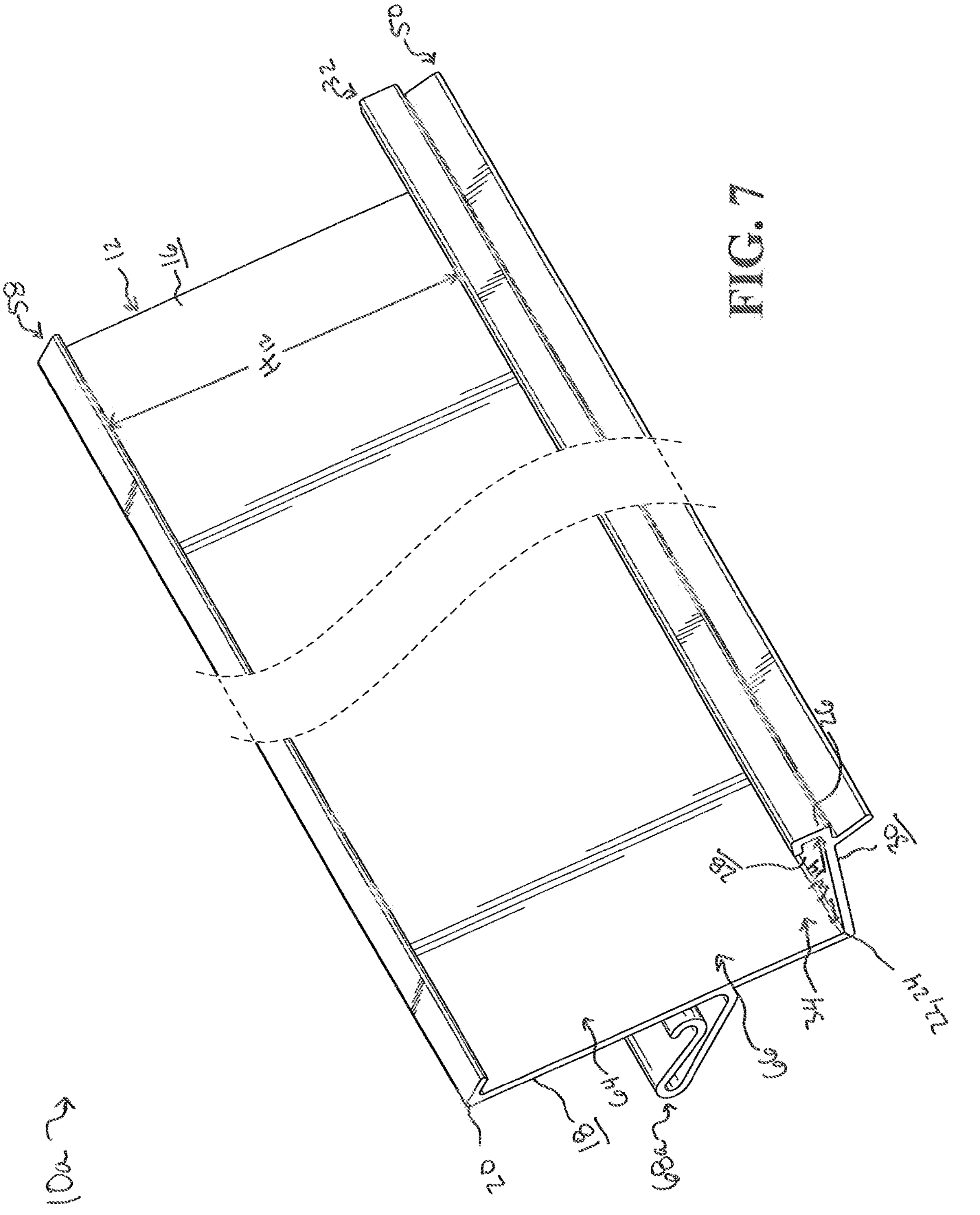
FIG. 7 is a perspective view of an electronic shelf label holder according to an example of the present disclosure.
Figure 8:
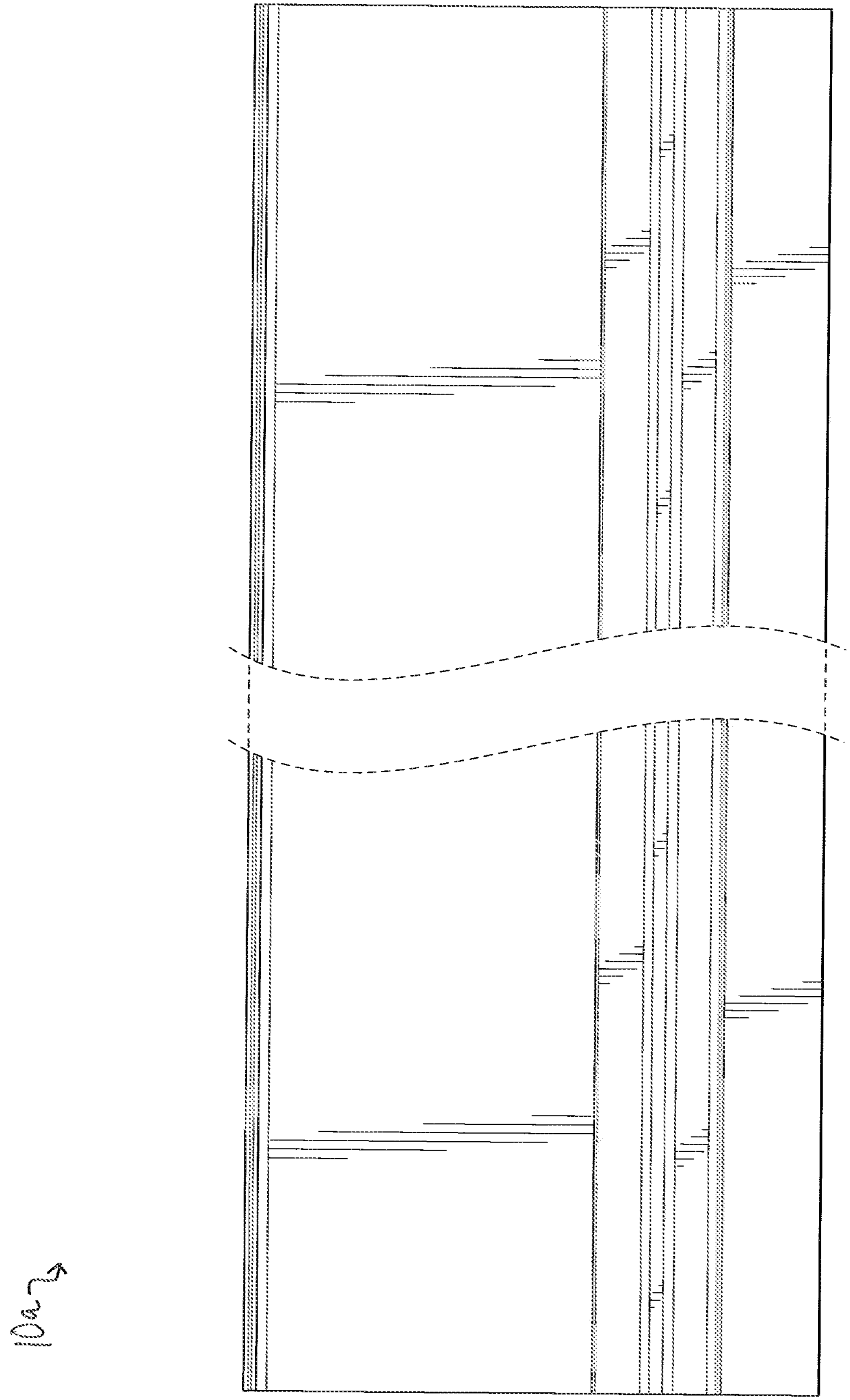
FIG. 8 is a front elevation view of the electronic shelf label holder of FIG. 7.
Figure 9:
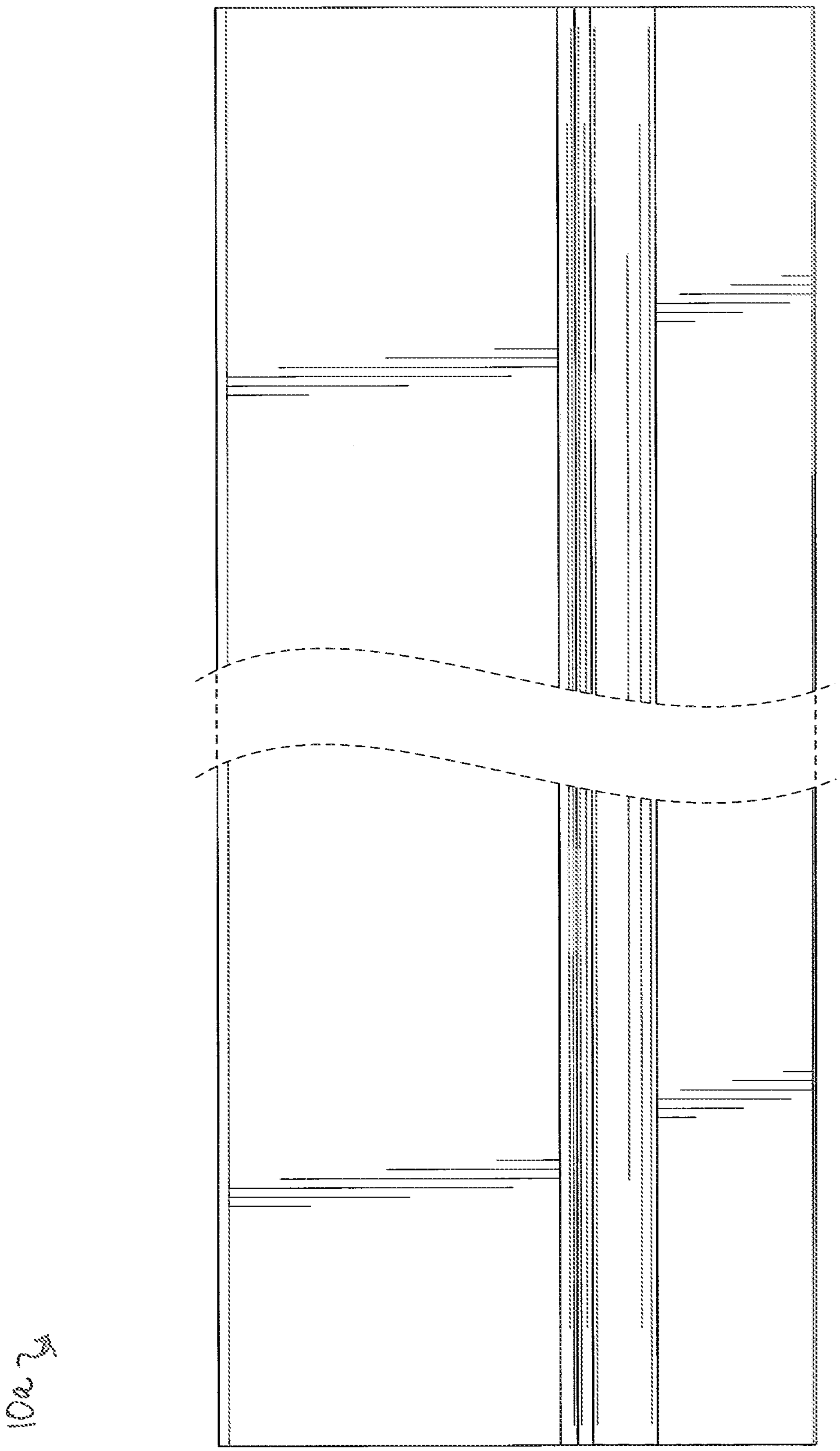
FIG. 9 is a back elevation view of the electronic shelf label holder of FIG. 7.

With continued reference to FIGS. 1, 4A, and 4B, the attachment system 10 further includes a lower retaining lip 32 disposed on the top side 28 of the base wall 14 and spaced apart from the front side 16 of the rear wall 12 to define a first channel 34 extending along the top side 28 of the base wall 14. As shown, the first channel 34 generally extends across a width W14 of the base wall 14 between the front side 16 of the rear wall 12 and the lower retaining lip 32 disposed on the top side 28 of the base wall 14. In some implementations, the first channel 34 extends continuously and uninterrupted from the front side 16 of the rear wall 12 to the lower retaining lip 32. Optionally, the first channel 34 extends continuously from the front side 16 of the rear wall 12 to the front edge 26 of the base wall 14.

The lower retaining lip 32 includes a front wall 36 extending from a first end 38 disposed at the top side 28 of the base wall 14 to a second end 40 spaced away from the top side 28 of the base wall 14. As shown, the front wall 36 extends transverse (i.e., normal or slanted) relative to the top side 28 of the base wall 14, and extends parallel to the rear wall 12. In some implementations, the front wall 36 aligns with and corresponds to the front edge 26 of the base wall 14. However, in other implementations, the front wall 36 may be inwardly offset from the front edge 26 of the base wall 14. The lower retaining lip 32 further includes a rear flange 42 extending from a first end 44 disposed at the second end 40 of the front wall 36 towards the rear wall 12 to a second, distal end 46. The rear flange 42 generally extends transverse (i.e., normal or slanted) relative to the front wall 36 and the rear wall 12. The rear flange 42 may be parallel to and spaced apart from the top side 28 of the base wall 14 to define a socket 48 extending between the lower retaining lip 32 and the base wall 14, and between the front wall 36 and the second, distal end 46 of the rear flange 42.

The attachment system 10 further includes a release tab 50 extending from a first end 52 disposed at the bottom side 30 of the base wall 14 to a distal second end 54 spaced away from the base wall 14. In particular, the release tab 50 is disposed adjacent to the front edge 26 of the base wall 14. In some implementations, the release tab 50 extends from the first end 52 at the bottom side 30 of the base wall 14 to the distal second end 54 at an acute angle $\alpha_{50}$ relative to the bottom side 30 of the base wall 14. The release tab 50 may be spaced apart from the front edge 26 of the base wall 14. As shown, the release tab 50 is inwardly offset from the front edge 26 of the base wall 14 such that the release tab 50 is disposed closer to the front edge 26 of the base wall 14 than the rear wall 12 to disengage the lower retaining lip 32. Alternatively, the release tab 50 extends from a front portion 56 of the base wall 14.

With continued reference to FIGS. 1-6, the attachment system 10 further includes an upper retaining lip 58 extending from a first end 60 disposed at the front side 16 of the rear wall 12 to a distal second end 62 spaced away from the front side 16 of the rear wall 12. In some examples, the upper retaining lip 58 extends towards the base wall 14 at an oblique angle $\alpha_{58}$ from the upper end 20 of the rear wall 12. The upper retaining lip 58 is spaced apart from the top side 28 of the base wall 14 to define a second channel 64 spanning a height $H_{12}$ of the rear wall 12 along the front side 16 of the rear wall 12. As shown, the second channel 64 generally extends between the upper retaining lip 58 and the top side 28 of the base wall 14. In some implementations, the second channel 64 extends continuously and uninterrupted from the upper retaining lip 58 to the top side 28 of the base wall 14. The first channel 34 and the second channel 64 may cooperate to define a receptacle 66 configured to receive the display device (not shown). Notably, the width $W_{14}$ of the base wall 14 and the height $H_{12}$ of the rear wall 12 may be modified (e.g., lengthened or shortened) to accommodate the dimensions of the respective display device received in the receptacle 66.

The attachment system 10 further includes a mounting member 68 attached to the rear wall 12. For example, the mounting member 68 is attached to the rear side 18 of the rear wall 12. The mounting member 68 is generally configured to engage a retail shelf (not shown) such that the attachment system 10 is installed on the front edge of the retail shelf, or other suitable base surface, for displaying the display device.

In operation, the attachment system 10 may be installed (e.g., via the mounting member 68) on a retail shelf at a place of commerce. The attachment system 10 may be inserted onto the retail shelf by a user exerting a force on the mounting member 68 such that the mounting member 68 clicks into place by engagement with the retail shelf. With reference to FIGS. 4A and 4B, the mounting member 68 may be configured to attach the rear wall 12 of the attachment system 10 to the retail shelf at a vertical angle. In particular, when the attachment system 10 is installed, the rear wall 12 may generally be described as extending vertically (i.e., perpendicular) with respect to the ground surface G.

In addition to attaching the attachment system 10 to the retail shelf, the user may install the display device into the receptacle 66. In particular, the display device may be positioned within the receptacle 66 such that an upper edge of the display device engages with the upper retaining lip 58 and a lower edge of the display device engages with the lower retaining lip 32. The upper edge of the display device may engage with the upper retaining lip 58 by sliding into the angle formed between the upper retaining lip 58 and the front side 16 of the rear wall 12, and once the upper edge of the display is engaged, the user may press the lower edge of the display device into the lower retaining lip 32 to exert a force on the base wall 14 such that the lower edge of the display device biases the base wall 14 until the lower edge of the display device is positioned within the socket 48 formed by the lower retaining lip 32 and the base wall 14. The base wall 14 may spring back into position when the lower edge of the display device is positioned within the socket 48 such that the lower retaining lip 32 maintains the lower edge of the display device within the socket 48 during use. To remove the display device from the attachment system 10, the user may exert a force on the release tab 50 to bias the base wall 14 away from the rear wall 12 (i.e., downward toward the ground surface G) to release the lower edge of the display device from the socket 48. Once the lower edge of the display device is released from the socket 48 the upper edge of the display device may be removed from the upper retaining lip 58. While, as shown, the first end 52 of the release tab 50 is disposed closer to the rear wall 12 in a longitudinal direction than the lower retaining lip 32, it should be understood that the release tab 50 may be placed in any position along the base wall 14 that allows the release tab 50 to bias the base wall 14 away from the rear wall 12.

With particular reference to FIGS. 7-12, an attachment system 10*a* is provided and includes a mounting member 68*a* attached to a rear wall 12 of the attachment system 10*a*. In view of the substantial similarity in structure and function of the components associated with the attachment system 10*a* with respect to the attachment system 10, like reference numerals are used hereinafter and in the drawings to identify like components while like reference numerals containing letter extensions are used to identify those components that have been modified.

Figure 10A:
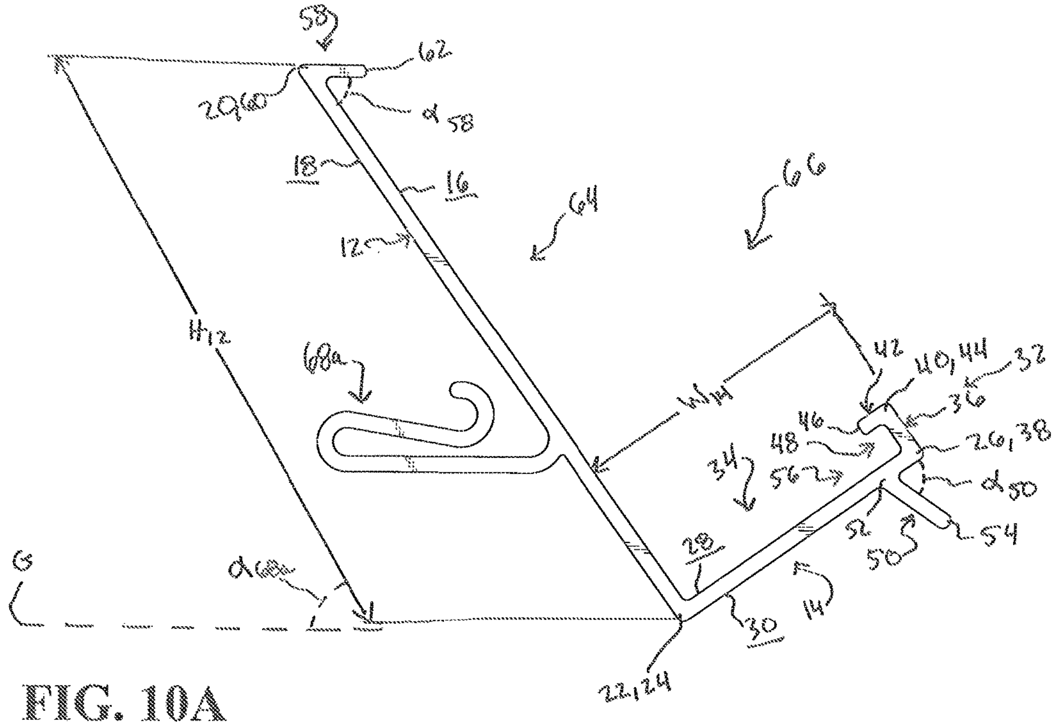
FIG. 10A is right end elevation view of the electronic shelf label holder of FIG. 7.
Figure 10B:
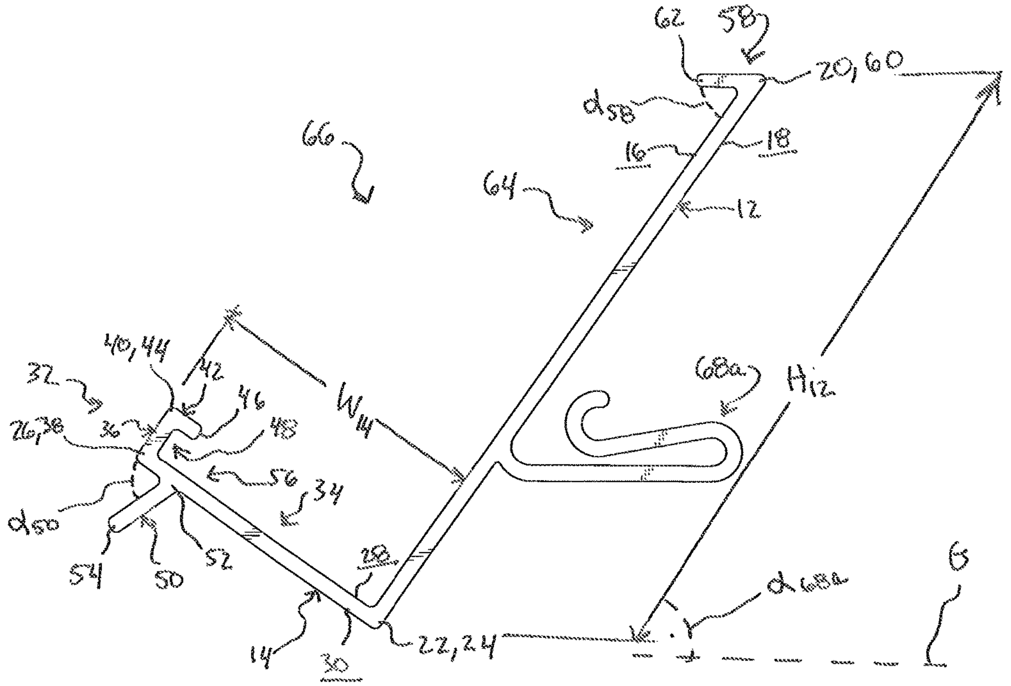
FIG. 10B is a left end elevation view of the electronic shelf label holder of FIG. 7.
Figure 11:
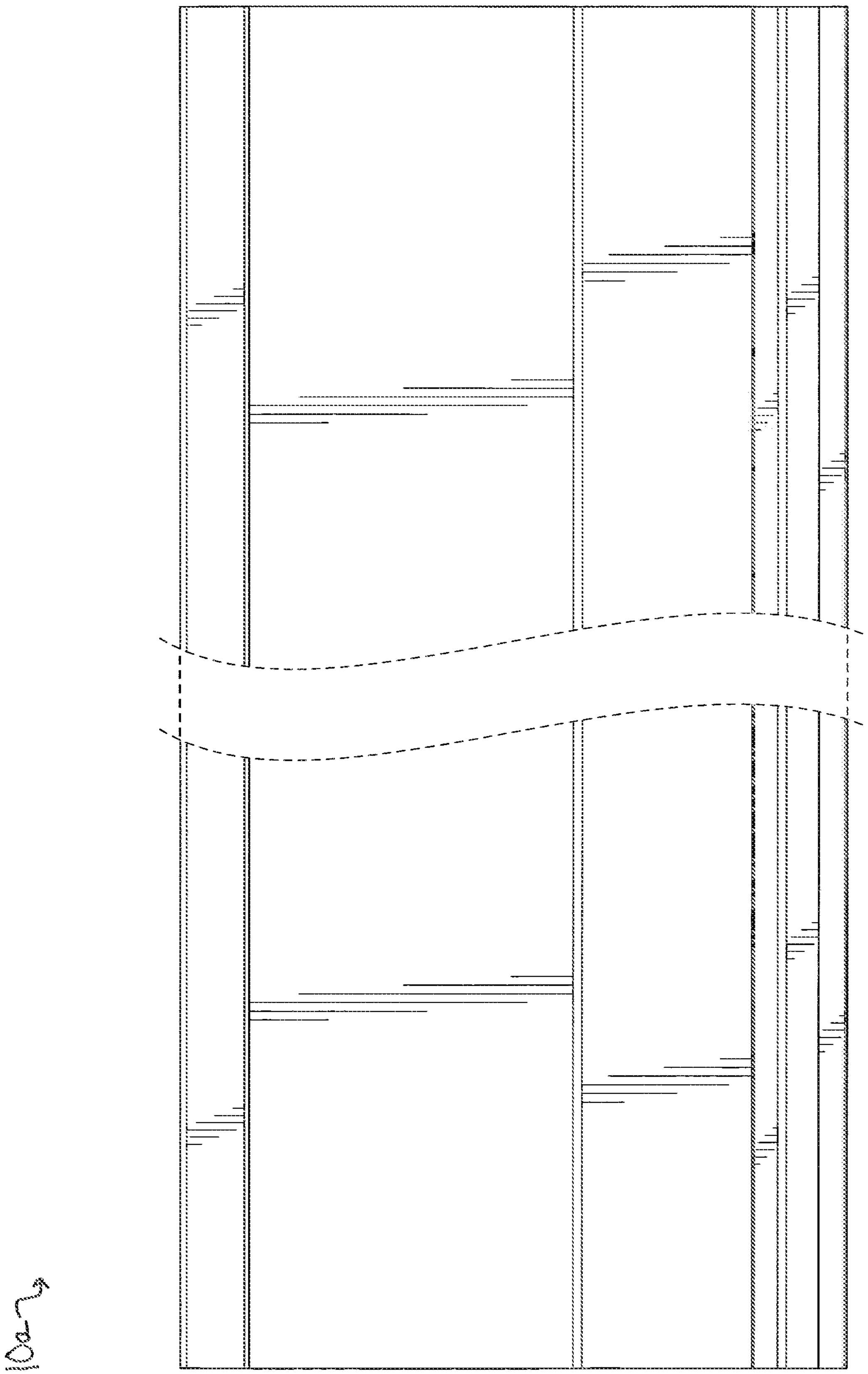
FIG. 11 is a top plan view of the electronic shelf label holder of FIG. 7.
Figure 12:
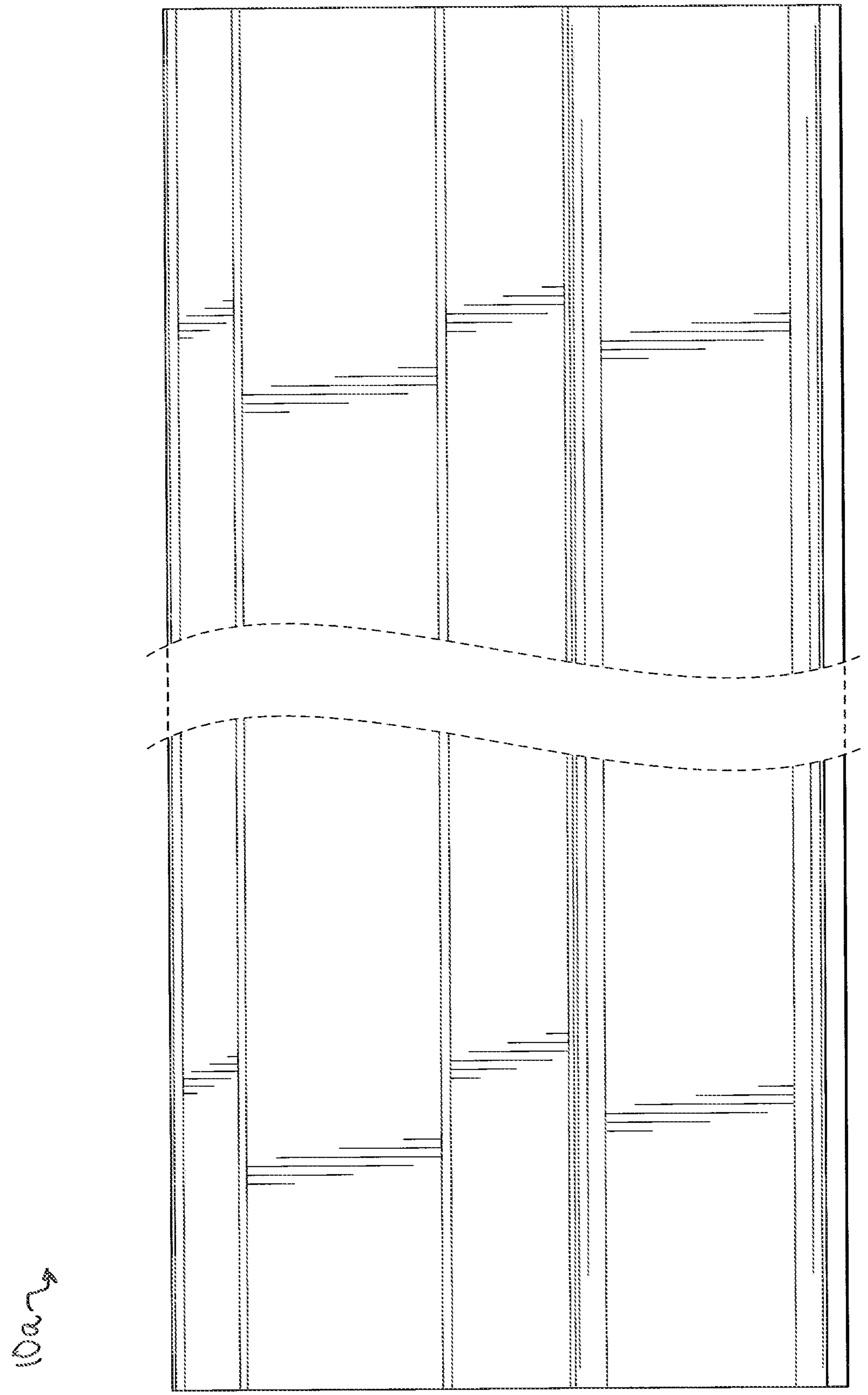
FIG. 12 is a bottom plan view of the electronic shelf label holder of FIG. 7.
Figure 13:
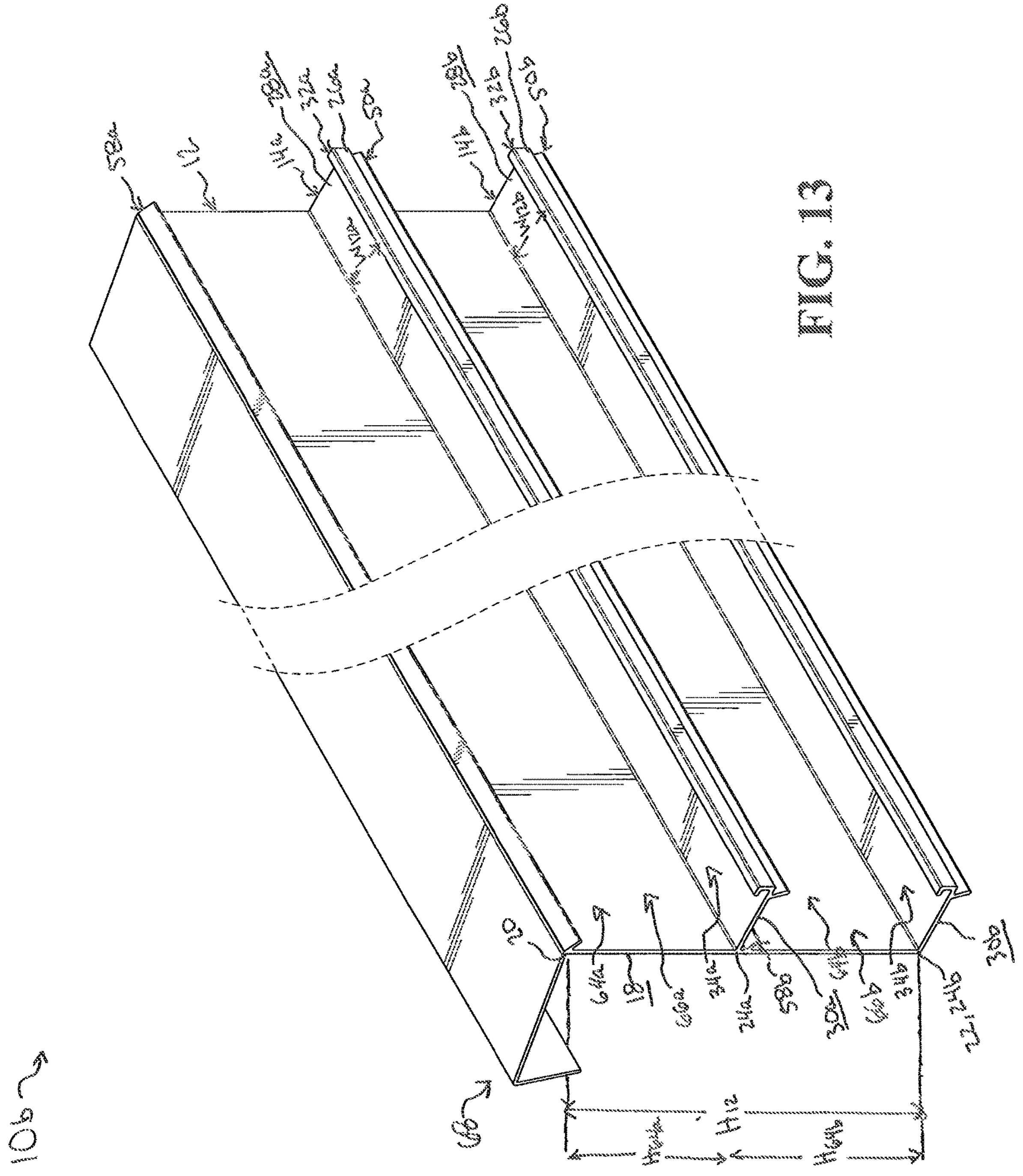
FIG. 13 is a perspective view of an electronic shelf label holder according to an example of the present disclosure.
Figure 14:
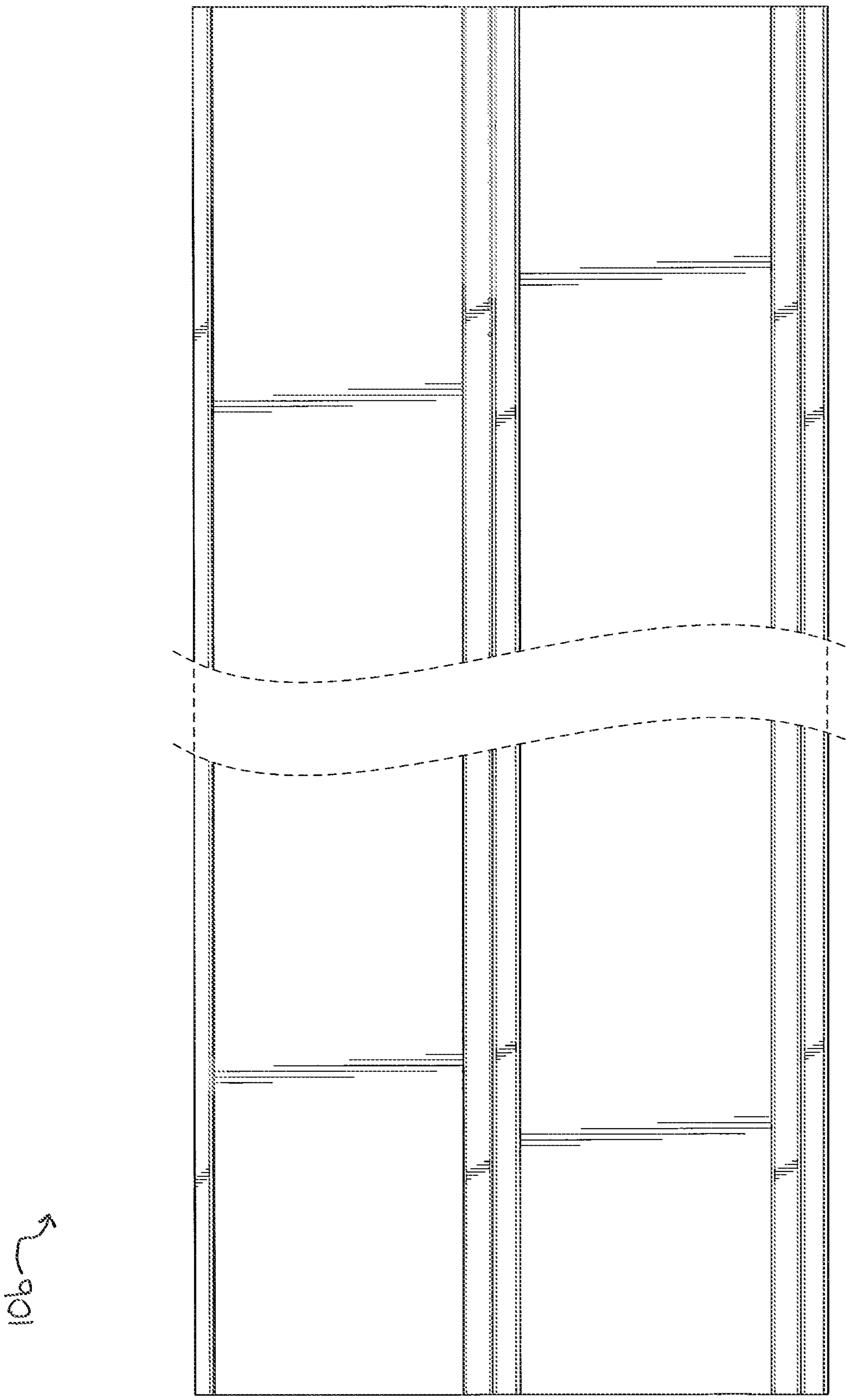
FIG. 14 is a front elevation view of the electronic shelf label holder of FIG. 13.
Figure 15:
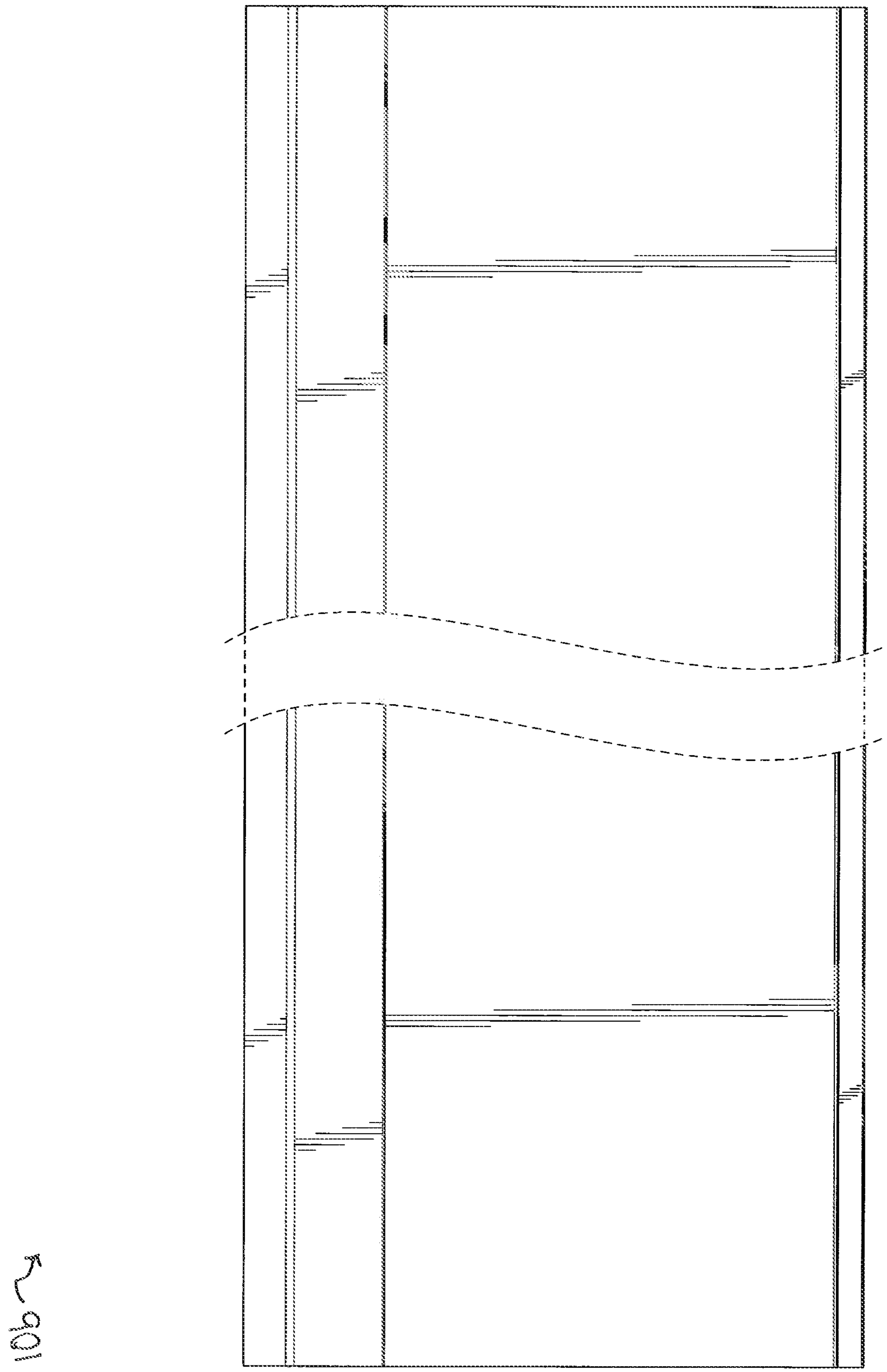
FIG. 15 is a back elevation view of the electronic shelf label holder of FIG. 13.

Referring to FIGS. 10A and 10B, the mounting member 68*a* may be configured to attach the rear wall 12 of the attachment system 10*a* to a retail shelf at an oblique angle $\alpha_{68a}$. In particular, the mounting member 68*a*, when fully installed on the retail shelf, positions the rear wall 12 at the oblique angle $\alpha_{68a}$ relative to the ground surface G. As shown, the oblique angle $\alpha_{68a}$ positions the rear wall 12 of the attachment system 10*a* such that the front side 16 of the rear wall 12 faces upward and away from the ground surface G for a customer of the retail store to more easily view the display device installed within the attachment system 10*a* when the attachment system 10*a* is installed on a retail shelf disposed lower than eye level of customers. In other implementations, the mounting member 68*a* attaches the rear wall 12 of the attachment system 10*a* at the oblique angle $\alpha_{68a}$ such that the rear wall 12 faces downward and toward the ground surface G for the customer of the retail store to more easily view the display device is installed within the attachment system 10*a* when the attachment system 10*a* is installed on a retail shelf disposed higher than eye level of customers.

With particular reference to FIGS. 13-18, an attachment system 10*b* is provided and includes a first base wall 14*a* and a second base wall 14*b* each attached to a rear wall 12 of the attachment system 10*b*. In view of the substantial similarity in structure and function of the components associated with the attachment system 10*b* with respect to the attachment system 10, like reference numerals are used hereinafter and in the drawings to identify like components while like reference numerals containing letter extensions are used to identify those components that have been modified.

In particular, the attachment system 10*b* includes a rear wall 12, a first base wall 14*a* (also referred to as an upper base wall 14*a*) and a second base wall 14 (also referred to as a lower base wall 14*b*). As detailed further below, the rear wall 12 and the base walls (14*a*, 14*b*) cooperate to form a first receptacle 66*a* and a second receptacle 66*b*, such that the attachment system 10*b* may receive two display devices. Advantageously, the dimensions and placement of the first base wall 14*a* and the second base wall 14*b* may be modified, thereby resulting in different sized receptacles 66*a*, 66*b*. To this end, the attachment system 10*b* may be configured to receive two display devices of the same size, or two display devices of different sizes. While the attachment system 10*b* includes two receptacles 66*a*, 66*b*, it should be appreciated that the attachment system 10*b* may include more than two receptacles 66.

As best shown in FIGS. 4A and 4B, the first base wall 14*a* extends normal to the rear wall 12 and from a first end 24*a* disposed at a midpoint (e.g., a position between the upper end 20 and the lower end 22 of the rear wall 12) of the front side 16 of the rear wall 12 to a second, front edge 26*a*. The first base wall 14*a* further includes a top side 28*a* and a bottom side 30*a* formed on an opposite side of the first base wall 14*a* from the top side 28*a*. Similarly, the second base wall 14*b* extends normal to the rear wall 12 and from a first end 24*b* disposed adjacent to the lower end 22 of the rear wall 12 and on the front side 16 of the rear wall 12 to a second, front edge 26*b*. The second base wall 14*b* further includes a top side 28*b* and a bottom side 30*b* formed on an opposite side of the second base wall 14*b* from the top side 28*b*. As the first base wall 14*a* and the second base wall 14*b* extend normal to the rear wall 12, the base walls 14*a*, 14*b* may also generally be defined as extending parallel to one another. In some examples, the base walls 14*a*, 14*b* extend from the rear wall 12 at different lengths such that the front edges 26*a*, 26*b* are offset from one another in a direction from the rear wall 12 to the front edges 26*a*, 26*b*.

The attachment system 10*b* further includes a first lower retaining lip 32*a* disposed on the top side 28*a* of the first base wall 14*a* and spaced apart from the front side 16 of the rear wall 12 to define an upper first channel 34*a* extending extends across a width $W_{14a}$ of the first base wall 14*a* along the top side 28*a* of the first base wall 14*a*. The attachment system 10*b* further includes a second lower retaining lip 32*b* disposed on the top side 28*b* of the second base wall 14*b* and spaced apart from the front side 16 of the rear wall 12 to define a lower first channel 34*b* extending across a width $W_{14b}$ of the second base wall 14*b* along the top side 28*b* of the second base wall 14*b*. As shown, the first channels 34*a*, 34*b* generally extend between the front side 16 of the rear wall 12 and the respective lower retaining lips 32*a*, 32*b* disposed on the top sides 28*a*, 28*b* of the base walls 14*a*, 14*b*. In some implementations, the respective first channels 34*a*, 34*b* extend continuously and uninterrupted from the front side 16 of the rear wall 12 to the respective lower retaining lips 32*a*, 32*b*. Optionally, the respective first channels 34*a*, 34*b* extend continuously from the front side 16 of the rear wall 12 to the respective front edges 26*a*, 26*b* of the base wall 14.

Each respective lower retaining lip 32*a*, 32*b* includes respective front walls 36*a*, 36*b* extending from first ends 38*a*, 38*b* disposed at the top sides 28*a*, 28*b* of the base walls 14*a*, 14*b* to second ends 40*a*, 40*b* spaced away from the top sides 28*a*, 28*b* of the base walls 14*a*, 14*b*. As shown, the respective front walls 36*a*, 36*b* extend normal to the respective top sides 28*a*, 28*b* of the base walls 14*a*, 14*b*, and extend parallel to the rear wall 12. In some implementations the front walls 36 align with and correspond to the front edges 26*a*, 26*b* of the base walls 14*a*, 14*b*, however in other implementations the front walls 36*a*, 36*b* are inwardly offset from the front edges 26*a*, 26*b* of the base walls 141, 14*b* such that the front walls 36*a*, 36*b* are disposed closer to the rear wall 12 than the front edges 26*a*, 26*b* of the base walls 14*a*, 14*b*.

The lower retaining lips 32*a*, 32*b* further include respective rear flanges 42*a*, 42*b* each extending from respective first ends 44*a*, 44*b* disposed at the second ends 40*a*, 40*b* of the front walls 36*a*, 36*b* towards the rear wall 12 to respective second, distal ends 46*a*, 46*b*. The rear flanges 42*a*, 42*b* generally extend normal to the front walls 36*a*, 36*b* and the rear wall 12. The rear flanges 42*a*, 42*b* may be parallel to and spaced apart from the respective top sides 28*a*, 28*b* of the respective base walls 14*a*, 14*b* to define respective sockets 48*a*, 48*b* (i.e., a first socket 48*a* and a second socket 48*b*) extending between the lower retaining lips 32*a*, 32*b* and the base walls 14*a*, 14*b*, and between the front walls 36*a*, 36*b* and the second, distal ends 46*a*, 46*b* of the rear flanges 42*a*, 42*b*.

Figure 16B:
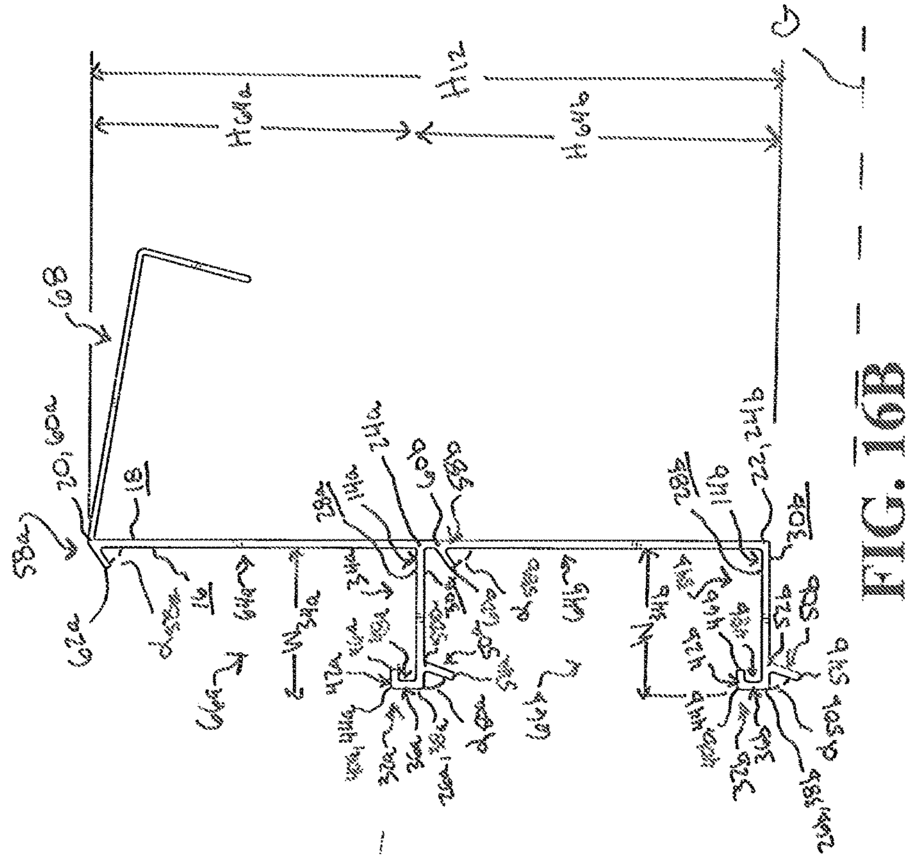
FIG. 16B is a left end elevation view of the electronic shelf label holder of FIG. 13.
Figure 16A:
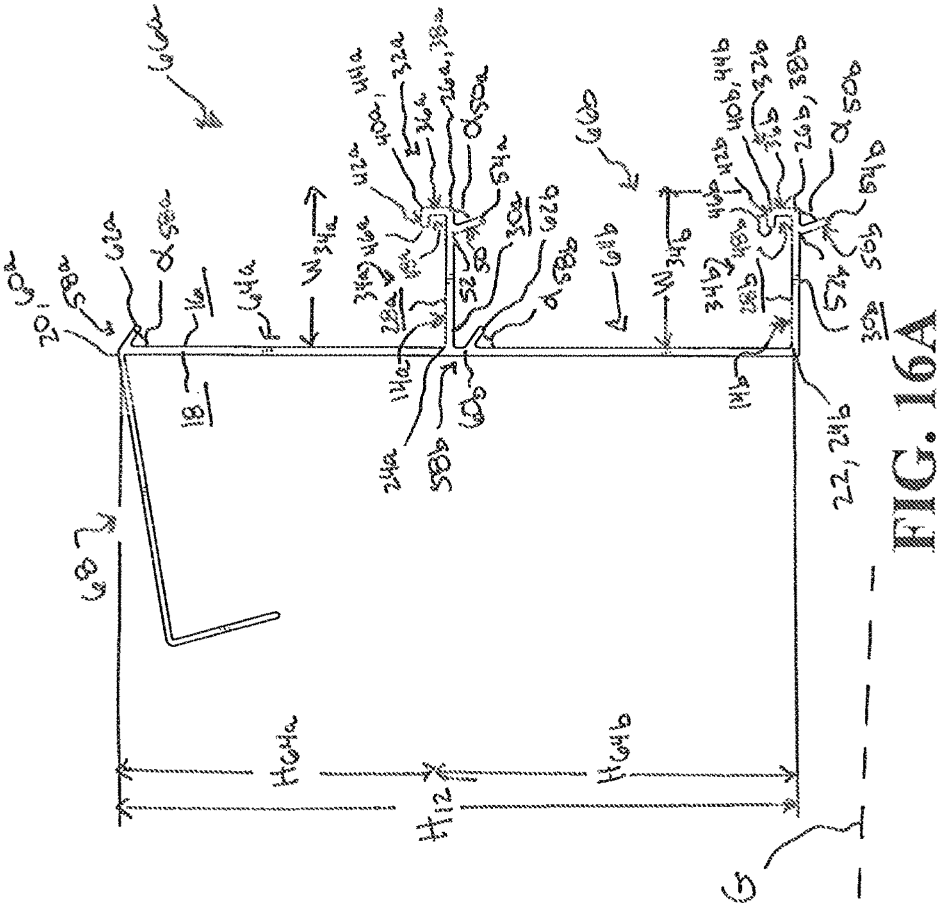
FIG. 16A is a right end elevation view of the electronic shelf label holder of FIG. 13.
Figure 17:
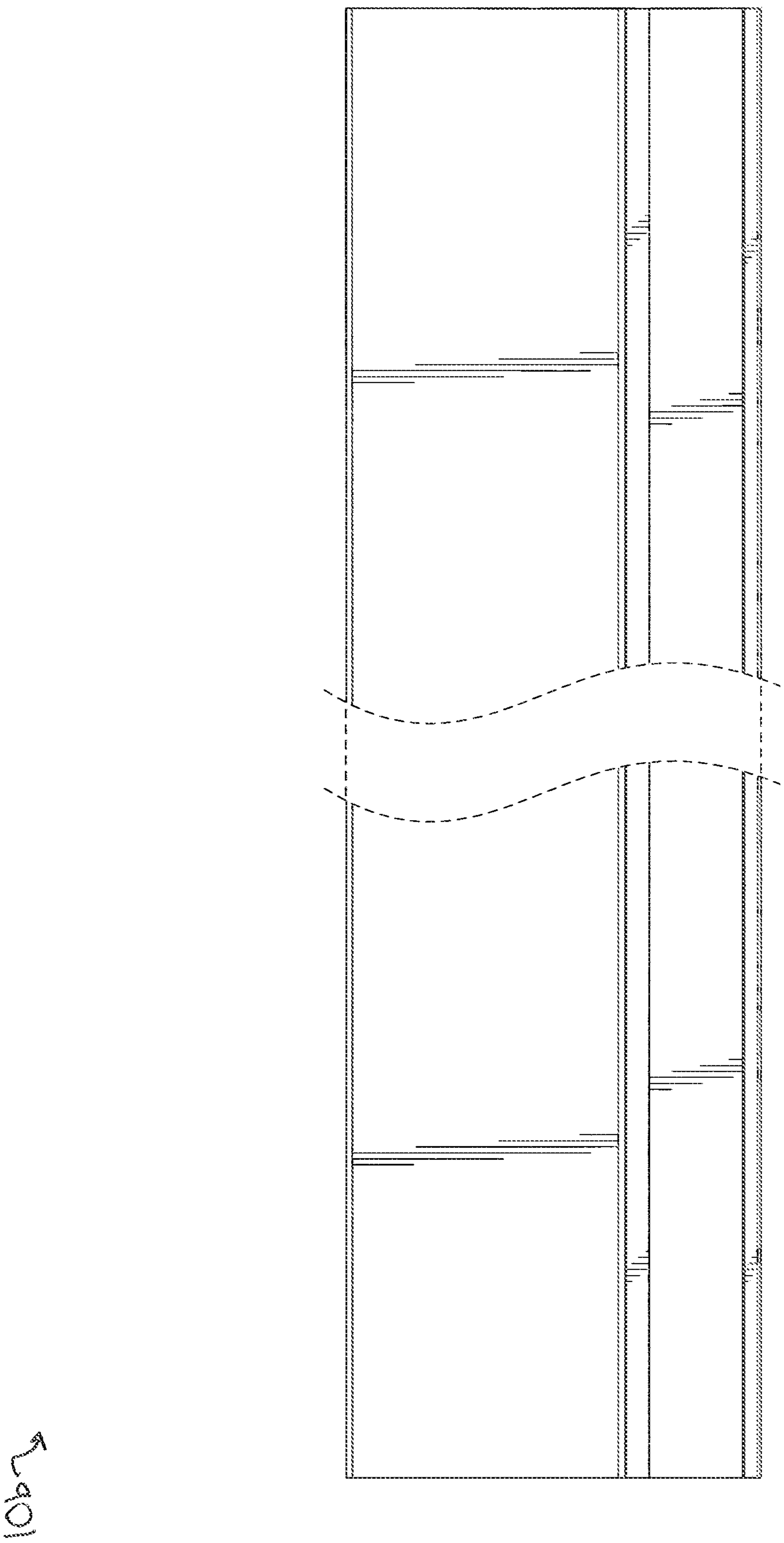
FIG. 17 is a top plan view of the electronic shelf label holder of FIG. 13.
Figure 18:
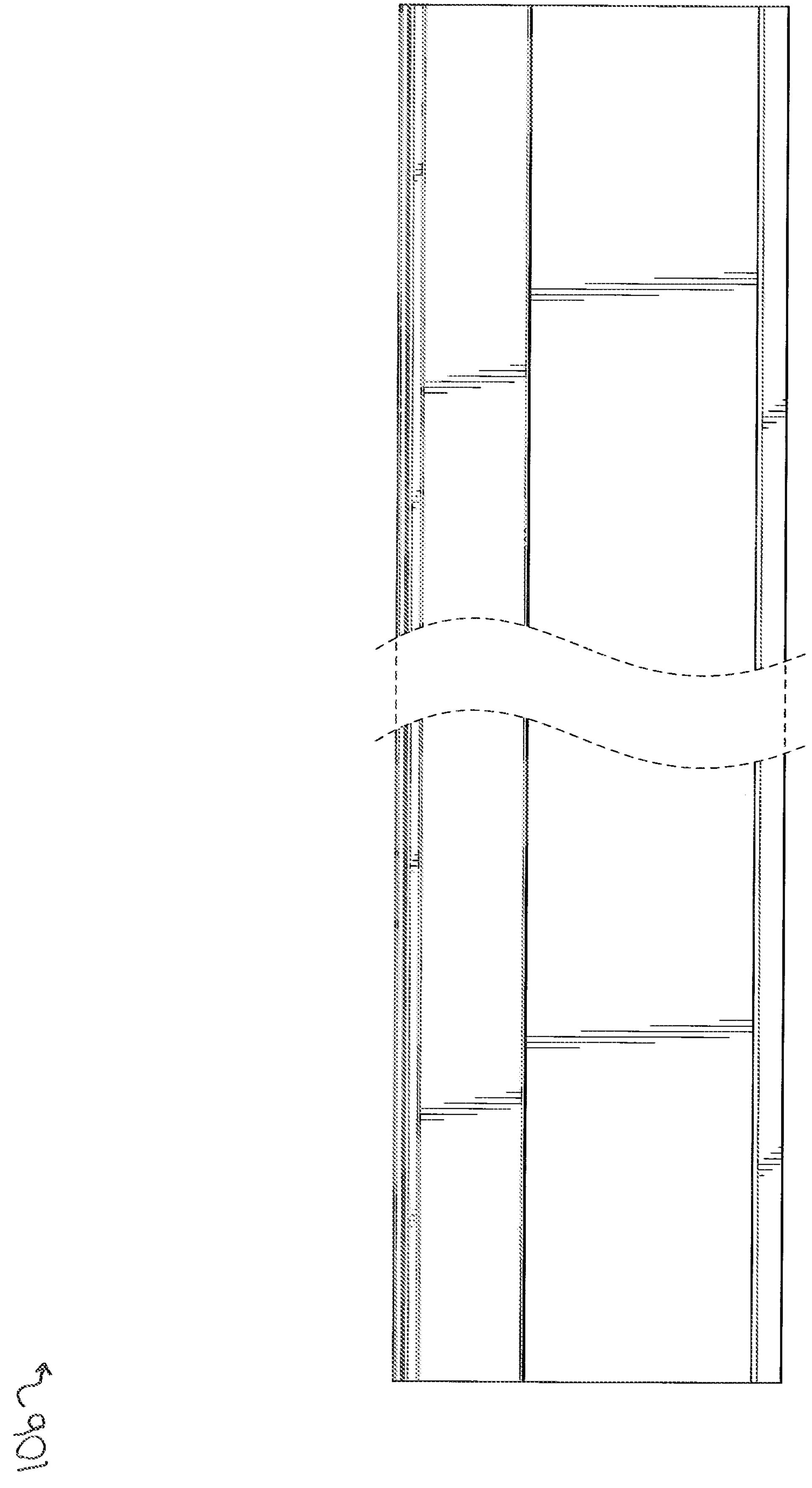
FIG. 18 is a bottom plan view of the electronic shelf label holder of FIG. 13.

The attachment system 10*b* further includes respective release tabs 50*a*, 50*b* each extending from respective first ends 52*a*, 52*b* disposed at the respective bottom sides 30*a*, 30*b* of the base walls 14*a*, 14*b* to respective distal second ends 54*a*, 54*b* spaced away from the base walls 14, 14*a*, 14*b*. In particular, the release tabs 50*a*, 50*b* are disposed adjacent to the respective front edges 26*a*, 26*b* of the base walls 14*a*, 14*b*. In some implementations, the release tabs 50*a*, 50*b* extend from the respective first ends 52*a*, 52*b* at the bottom sides 30*a*, 30*b* of the base walls 14*a*, 14*b* to the distal second ends 54*a*, 54*b* at respective acute angles $\alpha_{50a}$, $\alpha_{50a}$ relative to the bottom sides 30*a*, 30*b* of the base walls 14*a*, 14*b*. While the respective acute angles $\alpha_{50a}$, $\alpha_{50a}$ shown in FIGS. 16A and 16B are the same, in some implementations, the respective acute angles $\alpha_{50a}$, $\alpha_{50a}$ may be different from one another.

The release tabs 50*a*, 50*b* may be spaced apart from the respective front edges 26*a*, 26*b* of the base walls 14*a*, 14*b*. As shown, the release tabs 50*a*, 50*b* are inwardly offset from the front edges 26*a*, 26*b* of the base walls 14*a*, 14*b* such that the release tabs 50*a*, 50*b* is disposed closer to the rear wall 12 than the front edges 26*a*, 26*b* of the base walls 14*a*, 14*b* to disengage the lower retaining lips 32*a*, 32*b*. Alternatively, the release tabs 50*a*, 50*b* extend from respective front portions 56*a*, 56*b* of the base walls 14*a*, 14*b*. While the release tabs 50*a*, 50*b* are shown aligned with one another along their respective base walls 14*a*, 14*b*, the release tabs 50*a*, 50*b* may be offset from one another along their respective base walls 14*a*, 14*b*.

With continued reference to FIGS. 13-18, the attachment system 10*b* further includes a first upper retaining lip 58*a* and a second upper retaining lip 58*b*. Here, each upper retaining lip 58*a*, 58*b* extends from respective first ends 60*a*, 60*b* disposed at the front side 16 of the rear wall 12 to respective distal second ends 62*a*, 62*b* spaced away from the front side 16 of the rear wall 12. In some examples, the upper retaining lips 58*a*, 58*b* extend towards the base wall 14 at an oblique angle $\alpha_{58a}$, $\alpha_{58b}$ from the rear wall 12. While the respective oblique angles $\alpha_{58a}$, $\alpha_{58a}$ shown in FIGS. 16A and 16B are the same, in some implementations, the respective oblique angles $\alpha_{58a}$, $\alpha_{58a}$ may be different from one another.

The first upper retaining lip 58*a* is generally disposed at the upper end 20 of the rear wall 12, while the second upper retaining lip 58*b* is disposed generally between the upper end 20 of the rear wall 12 and the lower end 22 of the rear wall 12. As shown in FIGS. the second upper retaining lip 58*b* is disposed closer to the lower end 22 of the rear wall 12 than the second base wall 14*b*. The respective upper retaining lips 58*a*, 58*b* are spaced apart from the respective top sides 28*a*, 28*b* of the respective base walls 14*a*, 14*b* to define respective second channels 64*a*, 64*b* (i.e., upper second channel 64*a* and lower second channel 64*b*) each extending along the front side 16 of the rear wall 12. As shown, the second channels 64*a*, 64*b* are adjacent to one another and generally extend across a height $H_{12}$ of the rear wall 12, where the height $H_{12}$ of the rear wall 12 is divided into the upper second channel 64*a* and the lower second channel 64*b* by the second upper retaining lip 58*b*. In other words, each of the second channels 64*a*, 64*b* are defined by the respective upper retaining lips 58*a*, 58*b* and the respective top sides 28*a*, 28*b* of the respective base walls 14*a*, 14*b*. In some implementations, the second channels 64*a*, 64*b* extend continuously and uninterrupted from the upper retaining lips 58*a*, 58*b* to the top sides 28*a*, 28*b* of the base walls 14*a*, 14*b*. The upper first channel 34*a* and the upper second channel 64*a* may cooperate to define a first receptacle 66*a* configured to receive a first display device (not shown), while the lower first channel 34*b* and the lower second channel 64*b* cooperate to define a second receptacle 66*b* configured to receive a second display device (not shown). As noted above, the dimensions of the first base wall 14*a* and the second base wall 14*b* may be modified, as well as the placement of the base walls 14*a*, 14*b* on the rear wall 12, thereby resulting in different sized receptacles 66*a*, 66*b*. For example, the widths $W_{14a}$, $W_{14b}$ of the respective base walls 14*a*, 14*b* may be less than the width $W_{14}$ of the base wall 14. Likewise, the position of the second base wall 14*b* along the height H12 of the rear wall 12 may be modified to increase or decrease a respective height $H_{64a}$, $H_{64b}$ of the second channels 64*a*, 64*b*. To this end, each receptacle 66*a*, 66*b* may have a different dimension such that the attachment system 10*b* is be configured to receive two display devices of different sizes. Conversely, the receptacles 66*a*, 66*b* may have the same dimensions such that the attachment system 10*b* is configured to receive two display devices of the same size.

The terminology used herein is for describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms first, second, third, etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed herein could be termed a second element, component, region, layer or section without departing from the teachings of the example configurations.

The foregoing description has been provided for purposes of illustration and description. It is not intended to be exhaustive or to limit the disclosure. Individual elements or features of a particular configuration are generally not limited to that particular configuration, but, where applicable, are interchangeable and can be used in a selected configuration, even if not specifically shown or described. The same may also be varied in many ways. Such variations are not to be regarded as a departure from the disclosure, and all such modifications are intended to be included within the scope of the disclosure.

What is claimed is:

1. An attachment system for securing a display device to a retail shelf, the attachment system comprising:
- a rear wall including a front side and a rear side formed on an opposite side from the front side;
- a base wall extending from the front side of the rear wall to a front edge and including a top side and a bottom side formed on an opposite side from the top side;
- a lower retaining lip disposed on the top side of the base wall and spaced apart from the front side to define a first channel extending along the top side of the base wall;
- a release tab extending from the bottom side of the base wall in a direction toward the front edge and at an acute angle relative to the bottom side; and
- an upper retaining lip extending from the front side of the rear wall and spaced apart from the top side of the base wall to define a second channel extending along the front side of the rear wall.

2. The attachment system of claim 1, wherein the first channel and the second channel cooperate to define a receptacle configured to receive the display device.

3. The attachment system of claim 1, further comprising a mounting member attached to the rear side of the rear wall.

4. The attachment system of claim 3, wherein the mounting member is configured to attach the rear wall of the attachment system to the retail shelf at an oblique angle.

5. The attachment system of claim 3, wherein the mounting member is configured to attach the rear wall of the attachment system to the retail shelf at a vertical angle.

6. The attachment system of claim 1, wherein the release tab is spaced apart from the front edge of the base wall.

7. The attachment system of claim 1, wherein the release tab extends from a front portion of the base wall.

8. The attachment system of claim 1, wherein the base wall is perpendicular to the rear wall.

9. The attachment system of claim 1, wherein the upper retaining lip extends towards the base wall at an oblique angle from the rear wall.

10. The attachment system of claim 1, wherein the lower retaining lip includes a front wall extending from the top side of the base wall and a rear flange extending from the front wall towards the rear wall.

11. The attachment system of claim 10, wherein the rear flange is spaced apart from the top side of the base wall to define a socket between the lower retaining lip and the base wall.

12. An attachment system for securing a display device to a retail shelf, the attachment system comprising:

a rear wall including a front side and a rear side formed on an opposite side from the front side;

a base wall extending from the front side of the rear wall to a front edge and including a top side and a bottom side formed on an opposite side from the top side;

a lower retaining lip disposed on the top side of the base wall and spaced apart from the front side of the rear wall to define a first channel extending along the top side of the base wall;

a release tab extending from the bottom side of the base wall in a direction toward the front edge at an acute angle relative to the bottom side and spaced apart from the front edge of the base wall; and an upper retaining lip extending from the front side of the rear wall.

13. The attachment system of claim 12, wherein the upper retaining lip is spaced apart from the top side of the base wall to define a second channel extending along the front side of the rear wall.

14. The attachment system of claim 13, wherein the first channel and the second channel cooperate to define a receptacle configured to receive the display device.

15. The attachment system of claim 12, further comprising a mounting member attached to the rear side of the rear wall.

16. The attachment system of claim 12, wherein the release tab extends from a front portion of the base wall.

17. The attachment system of claim 12, wherein the upper retaining lip extends towards the base wall at an oblique angle from the rear wall.

18. The attachment system of claim 12, wherein the lower retaining lip includes a front wall extending from the top side of the base wall and a rear flange extending from the front wall towards the rear wall.

* * * * *